(12) United States Patent
Xiao

(10) Patent No.: US 12,078,808 B2
(45) Date of Patent: Sep. 3, 2024

(54) AUGMENTED REALITY DISPLAY APPARATUS AND AUGMENTED REALITY DISPLAY DEVICE COMPRISING SAME

(71) Applicant: MATRIXED REALITY TECHNOLOGY CO., LTD., Wuxi (CN)

(72) Inventor: Bing Xiao, Beijing (CN)

(73) Assignee: MATRIXED REALITY TECHNOLOGY CO., LTD., Wuxi (CN)

( * ) Notice: Subject to any disclaimer, the term of this patent is extended or adjusted under 35 U.S.C. 154(b) by 0 days.

(21) Appl. No.: 18/003,336

(22) PCT Filed: Jul. 22, 2021

(86) PCT No.: PCT/CN2021/107809
§ 371 (c)(1),
(2) Date: Dec. 26, 2022

(87) PCT Pub. No.: WO2022/017445
PCT Pub. Date: Jan. 27, 2022

(65) Prior Publication Data
US 2023/0266591 A1     Aug. 24, 2023

(30) Foreign Application Priority Data
Jul. 24, 2020 (CN) .......................... 202010722830.0

(51) Int. Cl.
*G02B 27/01* (2006.01)
(52) U.S. Cl.
CPC .. *G02B 27/0172* (2013.01); *G02B 2027/0127* (2013.01); *G02B 2027/0185* (2013.01)
(58) Field of Classification Search
CPC ........ G02B 27/0172; G02B 2027/0127; G02B 2027/0185
See application file for complete search history.

(56) References Cited

U.S. PATENT DOCUMENTS 10,610,775 B1 * 4/2020 Ebert ..................... G06F 3/013
10,698,224 B1 * 6/2020 Cooke ................... G02C 11/10
(Continued)

FOREIGN PATENT DOCUMENTS

| CN | 103487939 B | 4/2016 |
| CN | 106873155 A | 6/2017 |

(Continued)

OTHER PUBLICATIONS

International Search Report received in the corresponding International Application PCT/CN2021/107809, dated Oct. 25, 2021.
(Continued)

*Primary Examiner* — Ryan A Lubit

(57) ABSTRACT

An augmented reality display apparatus and an augmented reality display device comprising the same. The apparatus comprises: a display system (12) configured to display a target image; a depth acquisition assembly (11) configured to acquire depth position information of a target object, the target object including at least one of a human eye, the target image, and a real environment within a field of view of the human eye, the depth position information of the target object including at least one of position information of a depth plane at a gaze position of human eyes, position information of a depth plane where the target image is to be displayed, and position information of a depth plane of the real environment; a processor (13) fixedly connected to the display system (12), the processor (13) being configured to determine displacement information of the display system (12) based on the depth position information of the target object acquired by the depth acquisition assembly (11); a spectacle frame (15) connected to the display system (12) and the depth acquisition assembly (11); and a lifter (14) fixedly connected to the spectacle frame (15), the lifter (14) being connected to the processor (13) by a cable, a driver (142) in the lifter (14) being fixedly connected to the display (Continued)

(a)

(b)

system (12), the lifter (14) being configured to drive the display system (12) to move to a target position relative to the spectacle frame (15) based on the displacement information determined by the processor (13), the target position being a final arrival position of the display system (12) indicated by the displacement information.

17 Claims, 13 Drawing Sheets

(56) References Cited

U.S. PATENT DOCUMENTS

| | | | | |
|---|---|---|---|---|
| 11,614,570 | B1* | 3/2023 | Smyth | G02B 7/12 |
| | | | | 359/665 |
| 2011/0007277 | A1* | 1/2011 | Solomon | H04N 13/344 |
| | | | | 353/30 |
| 2017/0358136 | A1* | 12/2017 | Gollier | G06F 3/013 |
| 2019/0041797 | A1* | 2/2019 | Christmas | G03H 1/2294 |
| 2019/0204603 | A1* | 7/2019 | Li | G06F 3/013 |
| 2019/0384378 | A1* | 12/2019 | Ebert | G02B 27/0176 |

FOREIGN PATENT DOCUMENTS

| | | |
|---|---|---|
| CN | 109459864 A | 3/2019 |
| CN | 110456505 A | 11/2019 |
| CN | 110727111 A | 1/2020 |
| CN | 111929893 A | 11/2020 |
| CN | 212781494 U | 3/2021 |
| WO | 2020123357 A1 | 6/2020 |

OTHER PUBLICATIONS

First Office Action received in the corresponding Chinese Application 202010722830.0, dated Nov. 25, 2021.

The extended European Search Report received in the corresponding European Application 21845288.6, mailed Oct. 26, 2023.

* cited by examiner (a)

(b)

(a)

(b)

(a) (b)

(a)

(b)

Sequence of gaze depths of human eyes (1, 2, 3, i, N)

Sequence of display depths of a virtue image
(1, 2, 3, i, N)

Sequence of display depths of a virtue image
(1, 2, 3, i, N)

AUGMENTED REALITY DISPLAY APPARATUS AND AUGMENTED REALITY DISPLAY DEVICE COMPRISING SAME

TECHNICAL FIELD

The present disclosure relates to the field of augmented reality technology, in particular to an augmented reality display apparatus and an augmented reality display device comprising the same.

BACKGROUND

At present, most augmented reality apparatuses use a plurality of displays, which are arranged at different locations in the apparatus, respectively, so as to achieve multi-depth display, i.e., virtual images can be displayed at different depth positions in a real scene. However, with the plurality of displays, the cost of augmented reality apparatus also increases. Some other augmented reality apparatuses use a liquid lens as an optical processor in the apparatus, to control the angle and direction of light by controlling the shape of the liquid lens. However, the liquid lens has a strict requirement on the temperature of the surrounding environment. The ambient temperature affects an image display effect of such an augmented reality apparatus, such as resulting in a lowered contrast.

Therefore, there is a need to provide an augmented reality display apparatus that can achieve multi-depth augmented reality display while reducing the cost without affecting a virtual image display effect.

SUMMARY

Embodiments of the present disclosure provide an augmented reality display apparatus and an augmented reality display device comprising the same.

In a first aspect, embodiments of the present disclosure provide an augmented reality display apparatus including: a display system configured to display a target image; a depth acquisition assembly configured to acquire depth position information of a target object, the target object including at least one of human eyes, the target image, and a real environment within a field of view of human eyes, the depth position information of the target object including at least one of position information of a depth plane at a gaze position of human eyes, position information of a depth plane where the target image is to be displayed, and position information of a depth plane of the real environment; a processor fixedly connected to the display system, the processor being configured to determine displacement information of the display system based on the depth position information of the target object acquired by the depth acquisition assembly; a spectacle frame connected to the display system and the depth acquisition assembly; and a lifter fixedly connected to the spectacle frame, the lifter being connected to the processor by a cable, a driver in the lifter being fixedly connected to the display system, the lifter being configured to drive the display system to move to a target position relative to the spectacle frame based on the displacement information determined by the processor, the target position being a final arrival position of the display system indicated by the displacement information.

In a second aspect, embodiments of the present disclosure also provide an augmented reality display device including the augmented reality display apparatus provided in the first aspect.

BRIEF DESCRIPTION OF THE DRAWINGS

To describe technical solutions in embodiments of the present disclosure more clearly, drawings to be used in description of embodiments of the present disclosure will be introduced briefly below. Obviously, the drawings in the following description merely represent some embodiments of the present disclosure, and those of ordinary skill in the art can also obtain other drawings according to these drawings without creative work.

DETAILED DESCRIPTION

To solve the problems in the prior art that multi-depth augmented reality display is high in cost and display quality cannot be guaranteed, the present disclosure provides an augmented reality display apparatus including: a depth acquisition module, a display module, a processing module, a lift module, and a spectacle frame. The depth acquisition module is configured to acquire depth position information of a target object, the target object including at least one of a human eye, a target image, and a real environment within a field of view of the human eye. The depth position information of the target object includes position information of a depth plane at a gaze position of human eyes, and/or position information of a depth plane where the target image is to be displayed, and/or position information of a depth plane of the real environment. The display module is configured to display the target image. The processing module is fixedly connected to the display module, and the processing module is configured to determine displacement information of the display module based on the depth position information of the target object acquired by the depth acquisition module. The lift module is fixedly connected to the spectacle frame, and the lift module is connected to the processing module by a cable, a drive unit in the lift module is fixedly connected to the display module, the lift module is configured to drive the display module to move to a target position based on the displacement information determined by the processing module, the target position is a final arrival position of the display module indicated by the displacement information.

In this way, when the display module moves, it can ensure that the angle of light received by the human eye does not change, by ensuring an object-side telecentric optical structure between the display module and an optical module, and thus the lift module driving the display module to move within a displacement range, based on the displacement information determined by the processing module can achieve real-time multi-depth augmented reality display.

The above-mentioned depth acquisition module, display module, processing module, lift module, and drive unit may also be referred to as a depth acquisition assembly, a display system, a processor, a lifter, and a driver.

Technical solutions in embodiments of the present disclosure will be described below clearly and completely in conjunction with the accompanying drawings in embodiments of the present disclosure. Obviously, the described embodiments are part of, instead of all of the embodiments of the present disclosure. Based on the embodiments in the present disclosure, all other embodiments obtained by those of ordinary skill in the art without creative work fall into the protection scope of the present disclosure.

Technical solutions provided in the embodiments of the present disclosure are described in detail below in conjunction with the drawings.

Figure 1:
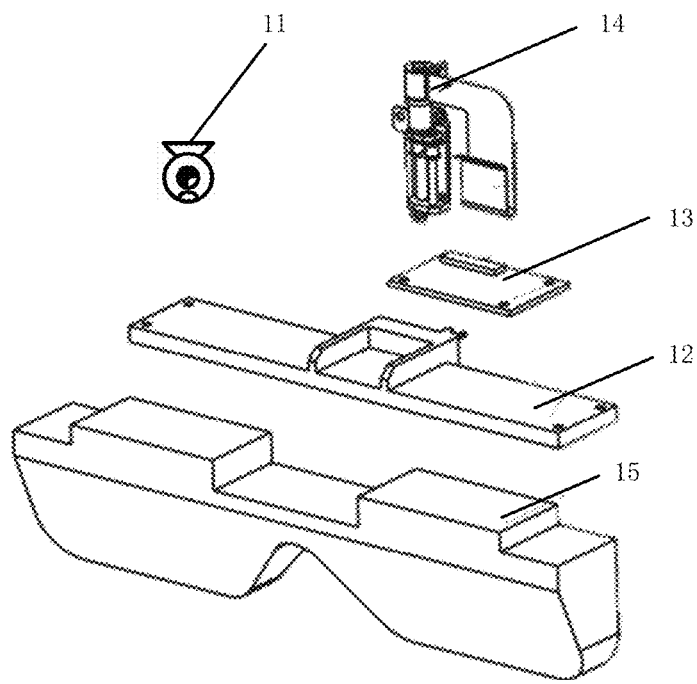
FIG. 1 is an exploded view of an augmented reality display apparatus provided in embodiments of the present disclosure.

See FIG. 1, which is an exploded view of an augmented reality display apparatus provided in embodiments of the present disclosure. The augmented reality display apparatus includes a depth acquisition assembly 11, a display system 12, a processor 13, a lifter 14, and a spectacle frame 15. The depth acquisition assembly 11 is configured to acquire depth position information of a target object. The display system 12 is configured to display a target image. The processor 13 is fixedly connected to the display system 12, and the processor 13 is configured to determine displacement information of the display system 12 based on the depth position information of the target object acquired by the depth acquisition assembly 11. The lifter 14 is fixedly connected to the spectacle frame 15, and the lifter 14 is connected to the processor 13 by a cable. A driver 142 in the lifter 14 is fixedly connected to the display system 12, and the lifter 14 is configured to drive the display system 12 to move to a target position based on the displacement information determined by the processor 13.

The target object includes at least one of a human eye, the target image, and a real environment within a field of view of the human eye. The depth position information of the target object includes position information of a depth plane at a gaze position of human eyes, and/or position information of a depth plane where the target image is to be displayed, and/or position information of a depth plane of the real environment. The target position is a final arrival position of the display system 12 indicated by the displacement information.

Optionally, in order to be able to acquire the position information of the depth plane at the gaze position of human eyes, and/or the position information of the depth plane where the target image is to be displayed, and/or the position information of the depth plane of the real environment, the depth acquisition assembly 11 may include a set of multiple types of depth acquisition devices.

The depth acquisition assembly 11 at least includes one of a human eye tracking device, a structured light depth sensing device, a binocular vision depth sensing device, and a time-of-flight depth sensing device.

It should be understood that depth acquisition devices for different uses may be provided at different locations within the augmented reality display apparatus provided in embodiments of the present disclosure to implement their respective functions.

In the process that the lifter 14 drives the display system 12 to move, the display system 12 may tilt, resulting in that a plane where a display screen of the display system 12 is located is not in a preset plane that meets optical conditions, such that the image displayed by the display system 12 may not reach the human eye. Thus, in order to ensure that the plane where the display screen of the display system 12 is located is always in the preset plane, a plurality of miniature springs 141 may be provided between the display system 12 and the spectacle frame 15, and the plurality of miniature springs 141 may be configured to connect the display system 12 and the spectacle frame 15. In addition, the plurality of miniature springs 141 can also provide a compressive restoring force for the movement of the display system 12.

In an example, the lifter 14 may include a plurality of miniature springs 141, one end of each miniature spring 141 is fixedly connected to the display system 12 and the other end thereof is fixedly connected to the spectacle frame 15. When the driver 142 drives the display system 12 to move, the plurality of miniature springs 141 are configured to keep a tilt angle of the display system 12 consistent with that of the display system 12 before displacement. That is, the plurality of miniature springs 141 are configured to keep the tilt angle of the display system 12 consistent during the displacement.

Figure 2:
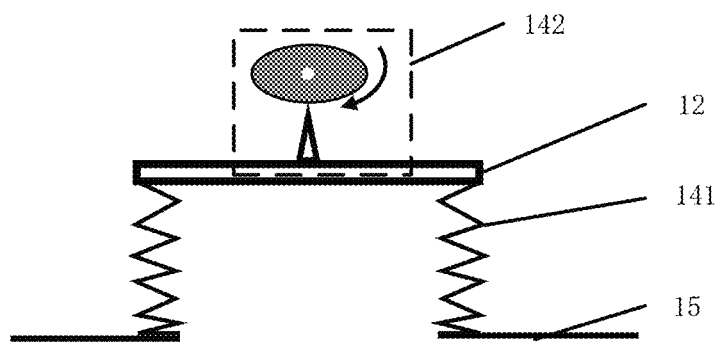
FIG. 2 is a schematic diagram of a plurality of micro-springs of an augmented reality display apparatus provided in embodiments of the present disclosure.
Figure 2:
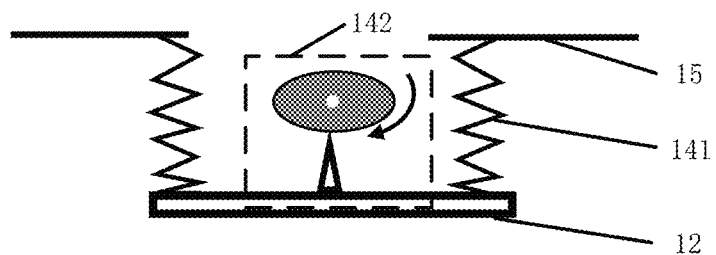

FIG. 2 shows a schematic diagram of a plurality of miniature springs of an augmented reality display apparatus provided in embodiments of the present disclosure. FIG. 2(*a*) is a schematic diagram of connection of the plurality of miniature springs to a front side of the display system, provided in embodiments of the present disclosure. One end of each miniature spring 141 is fixedly connected to a region without the display screen, of the front side of the display system 12. The front side of the display system 12 is a side of the display system 12 on which the display screen of the display system 12 is located. FIG. 2(*b*) is a schematic diagram of connection of the plurality of miniature springs to a back side of the display system, provided in embodiments of the present disclosure. One end of each miniature spring 141 is connected to the back side of the display system 12. The back side of the display system 12 is a side of the display system 12 opposite to the front side of the display system 12.

It should be understood that FIG. 2 provides only schematic diagrams at one side, and the miniature springs in the figure may be illustrations of the plurality of miniature springs 141 overlapped. Regardless of how many miniature springs are adopted, which connection mode is used to connect the plurality of miniature springs 141 to the display system 12, and connect the plurality of miniature springs 141 to the spectacle frame 15, or which layout is used to set the positions of the plurality of miniature springs 141, it is an implementation to be protected by the present disclosure as long as the display system 12 can be kept stable during movement.

Figure 3:
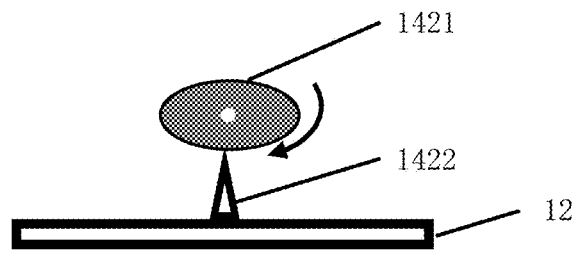
FIG. 3 is a schematic structural diagram of a driver of the augmented reality display apparatus provided in embodiments of the present disclosure.

Optionally, an internal space of the augmented reality display apparatus provided in embodiments of the present disclosure is limited, and a displacement range of the display system 12 is also small, so providing a displacement amount by a diameter length of the cam 1421 can satisfy the movement requirement of the display system 12. FIG. 3 shows a schematic structural diagram of a driver of an augmented reality display apparatus provided in embodiments of the present disclosure.

In an example, the driver 142 includes a cam 1421. The cam 1421 is rotatable about a central axis of rotation of the cam. The surface of the cam 1421 is in slide fit with the back side of the display system 12. When the cam 1421 rotates about the center of rotation, the cam 1421 is configured to drive the display system 12 to displace. That is, by rotating about the central axis of rotation of the cam, the cam drives the display system to displace.

The back side of the display system 12 may be provided with a miniature support 1422, and is connected to the cam 1421 by the miniature support 1422. A motor that drives the cam 1421 to rotate may include a stepper motor, a brush motor, a brushless motor, a coreless motor, or the like.

Optionally, if the displacement range of the display system 12 is small, a voice coil motor 143 may also be used in place of the cam 1422, to achieve the purpose of precisely driving the display system 12 to move to the target position, and the small volume of the voice coil motor 143 can also save the internal space of an augmented reality display apparatus.

In an example, the driver 142 may include a voice coil motor 143. The voice coil motor 143 is fixedly connected to the back side of the display system 12, and the voice coil motor 143 is configured to drive the display system to displace to the target position.

Optionally, in order to precisely drive the display system 12 to arrive at the target position, the display system 12 can be first driven by the cam 1421 to move to the vicinity of the target position, and then the position of the display system 12 is finely adjusted by the voice coil motor 143, so that the display system 12 can be accurately located at the target position. Such combined structure of the cam 1421 and the voice coil motor 143 can be applied to an augmented reality display apparatus with a high display requirement.

Figure 4:
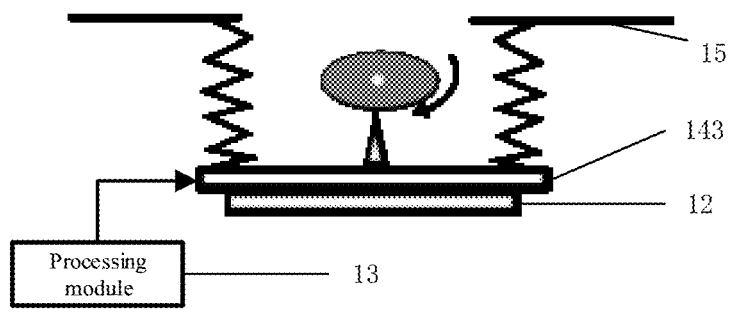
FIG. 4 is a schematic diagram of a voice coil motor of an augmented reality display apparatus provided in embodiments of the present disclosure.

FIG. 4 shows a schematic diagram of a voice coil motor of an augmented reality display apparatus provided in embodiments of the present disclosure.

The driver 142 includes a voice coil motor 143. The surface of the cam 1421 is in slide fit with the back side of the display system 12. The cam 1421 rotates about the center of rotation of the cam 1421. The cam 1421 and the voice coil motor 143 are configured to drive the display system 12 to displace. The voice coil motor 143 is connected to the processor 13, and the processor 13 is configured to acquire position information of the display system 12 and, based on the position information of the display system 12, determine a distance and direction of fine adjustment of the display system 12 driven by the voice coil motor 143. The voice coil motor 143 is fixedly connected to the back side of the display system 12, and the voice coil motor 143 is configured to finely adjust the position of the display system 12 when the display system 12 displaces to the vicinity of the target position, so that the display system 12 arrive at the target position.

In addition, the back side of the display system 12 may be provided with a miniature support 1422, and is connected to the cam 1421 by the miniature support 1422.

Optionally, if the displacement range of the display system 12 is small, the cam 1421 can be omitted, and only the voice coil motor 143 can also drive the display system 12 to the target position.

Optionally, in order to enable light emitted from pixels 1201 of the display system 12 to be optically processed and reach the human eye at the same time as light of the actual scene, an augmented reality display apparatus provided in embodiments of the present disclosure further includes an optical module 16 capable of processing light. The above-mentioned optical module may also be referred to as an optical system.

Figure 5:
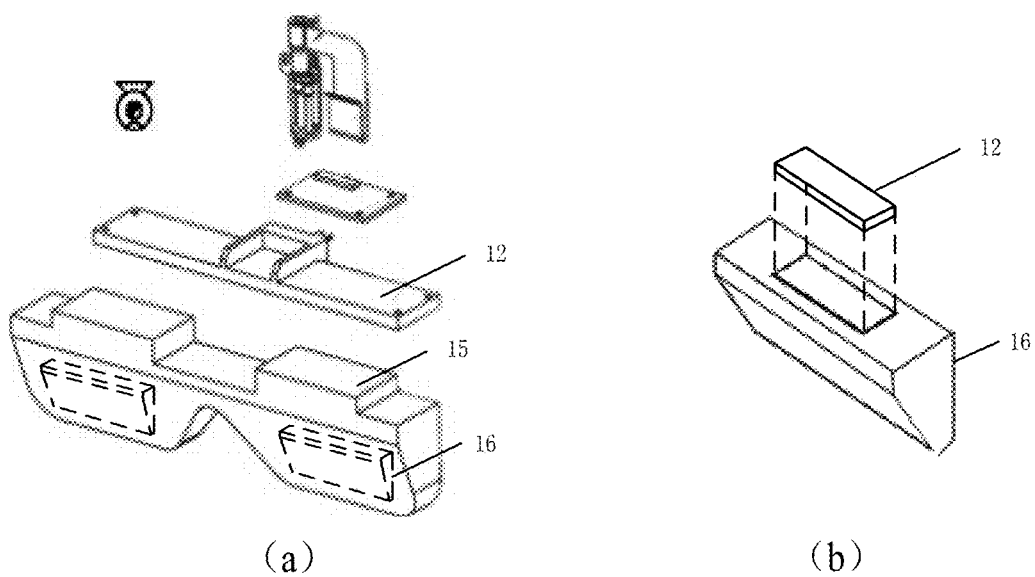
FIG. 5 shows a schematic diagram of an optical system of an augmented reality display apparatus provided in embodiments of the present disclosure.

FIG. 5 shows a schematic diagram of an optical system of an augmented reality display apparatus provided in embodiments of the present disclosure. In FIG. 5(*a*), the augmented reality display apparatus may include two optical systems 16 that are in left-right symmetry and have the same internal structure, and may also include one optical system 16 that can process light corresponding to the left and right eyes, and one or two optical systems 16 may be arranged in the interior of the spectacle frame 15. As shown in FIG. 5(b), relative positions of the display system 12 and the optical system 16 and a relative angle therebetween should meet the requirements of the optical system in the actual application scenario. As an example, a focal length range of the optical system 16 may be between 10 mm and 50 mm, and an angle range between its principal ray 1202 and the surface of the display system 12 may be less than 30 degrees.

In an example, an augmented reality display apparatus further includes an optical system 16. The optical system 16 is fixedly connected to the spectacle frame 15. The optical system 16 is optically aligned with the display system 12 to perform preset processing on the light emitted from the pixels 1201 in the display system 12, so that the light emitted by the display system 12 arrives at the human eye. The preset processing includes at least one of amplification processing, reflection processing, and transmission processing.

Figure 6:
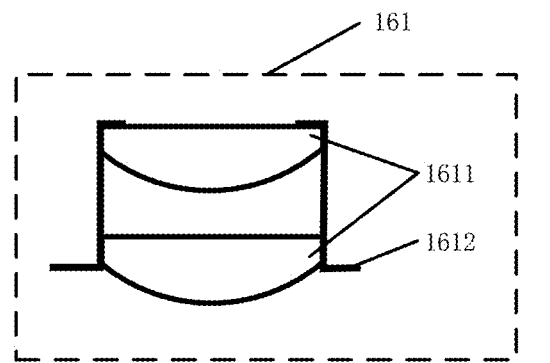
FIG. 6 shows a schematic diagram of a lens assembly of an augmented reality display apparatus provided in embodiments of the present disclosure.
Figure 6:
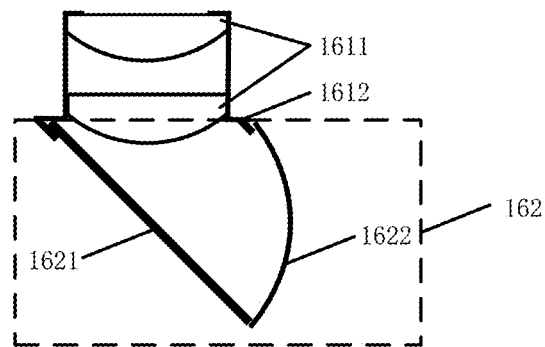

Optionally, in order to enable the light processed by the optical system 16 to produce an expected display effect after reaching the human eye, the optical system 16 in the augmented reality display apparatus provided in embodiments of the present disclosure may include a lens unit 161 and an optical preprocessing unit. FIG. 6 shows a schematic diagram of a lens assembly of an augmented reality display apparatus provided in embodiments of the present disclosure. The above-mentioned lens unit and optical preprocessing unit may also be referred to as a lens assembly and an optical preprocessing assembly.

In an example, the optical system 16 includes a lens assembly 161. The lens assembly 161 is fixedly connected to the spectacle frame 15, and the lens assembly 161 includes at least one lens 1611 optically aligned. The lens assembly 161 is configured to perform aberration correction on the light emitted from the pixels 1201 in the display system 12.

As an example, two lenses 1611 in FIG. 6(a) are arranged one above the other and are fixedly connected to a lens tube 1612, respectively, and light enters from an upper inlet of the lens assembly 161, then exits from a lower outlet, and impinges on an optical preprocessing assembly 162.

Figure 7:
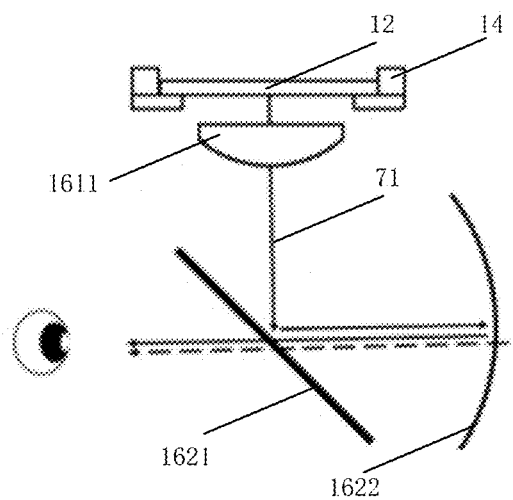
FIG. 7 shows a schematic diagram of another lens assembly of an augmented reality display apparatus provided in embodiments of the present disclosure.
Figure 7:
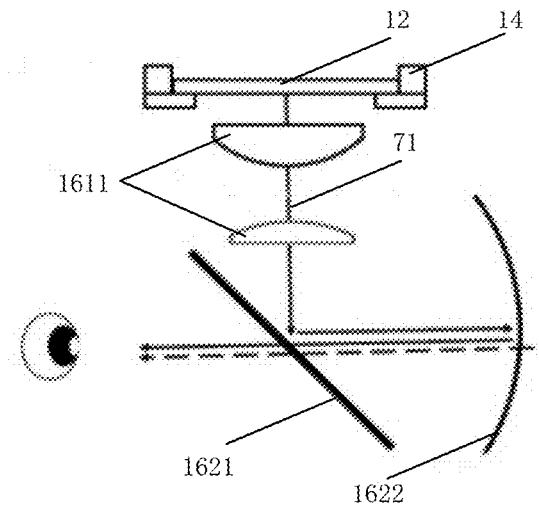

FIG. 7 shows a schematic diagram of another lens assembly of an augmented reality display apparatus provided in embodiments of the present disclosure. The lens assembly 161 may include one lens 1611 shown in FIG. 7(a) or two lenses 1611 shown in FIG. 7(b), with the light passing through the lens assembly 161 in a direction as indicated by the direction of light 71.

In an example, an optical system 16 includes an optical preprocessing assembly 162. The optical preprocessing assembly 162 is fixedly connected to the spectacle frame 15, and the optical preprocessing assembly 162 is configured to preprocess the light emitted from the pixels 1201 in the display system 12.

The optical preprocessing assembly 162 may include a beam-splitting element 1621 and a reflective element 1622, the beam-splitting element 1621 and the reflective element 1622 are optically aligned. The beam-splitting element 1621 is light-transmissive, and the beam-splitting element 1621 is configured to reflect the light emitted from the pixels 1201 in the display system 12 to the reflective element 1622. The reflective element 1622 is configured to reflect the light reflected by the beam-splitting element 1621 to the beam-splitting element 1621 such that the light reflected by the beam-splitting element 1621 penetrates through the beam-splitting element 1621 and arrives at the human eye.

In an example, the lens assembly 161 is fixedly connected to the optical preprocessing assembly 162, and the lens assembly 161 is arranged above the optical preprocessing assembly 162, and the lens assembly 161 is optically aligned with the optical preprocessing assembly 162, such that the light subjected to aberration correction by the lens assembly 161 arrives at the beam-splitting element 1621 of the optical preprocessing assembly 162.

As an example, in FIG. 6(b), the lens assembly 161 and the optical preprocessing assembly 162 are fixedly connected by a lens tube 1612, and light exits from the lens assembly 161 and impinges on the optical preprocessing assembly 162.

Figure 8:
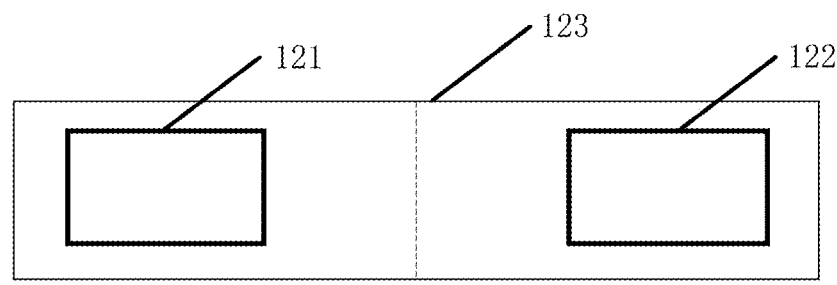
FIG. 8 is a schematic diagram of a display system of an augmented reality display apparatus provided in embodiments of the present disclosure.

Optionally, as shown in FIG. 8, which is a schematic diagram of a display system of an augmented reality display apparatus provided in embodiments of the present disclosure, the display system 12 may also include a first display 121 and a second display 122 corresponding to the left and right eyes of a person, each display includes an independent display screen. Moreover, to meet the symmetry of the human eyes, the first display 121 and the second display 122 may be symmetrical about a centerline axis of a substrate. The first display 121 and the second display 122 may include any display screen that can be applied to the augmented reality display apparatus.

In an example, the display system 12 includes a first display 121, a second display 122, and a support substrate 123. The first display 121 corresponds to the left eye and is configured to emit light of the target image to the left eye of the person, and the second display 122 corresponds to the right eye and is configured to emit light of the target image to the right eye. The first display 121 and the second display 122 are fixedly connected to the support substrate 123, respectively, and the first display 121 and the second display 122 are symmetrical about a centerline axis of the support substrate 123.

It should be understood that the fixed connections of structures such as the depth acquisition assembly 11, the optical system 16, the plurality of miniature springs 141 or the lifter 14 to the spectacle frame 15 are provided to avoid changes in positions of internal structures caused by external movement or shaking of the augmented reality display apparatus, which otherwise affecting an overall augmented reality display effect. Relative positions of the display system 12, the optical system 16 and the human eye, and relative positions of the lens assembly 161 and the optical preprocessing assembly 162 should meet optical design requirements such as object-side telecentricity. In addition, all the fixed connections described above in embodiments of the present disclosure may be implemented by gluing, screwing, etc., and all connecting means that enable structures to be fixed to each other are possible.

Figure 9:
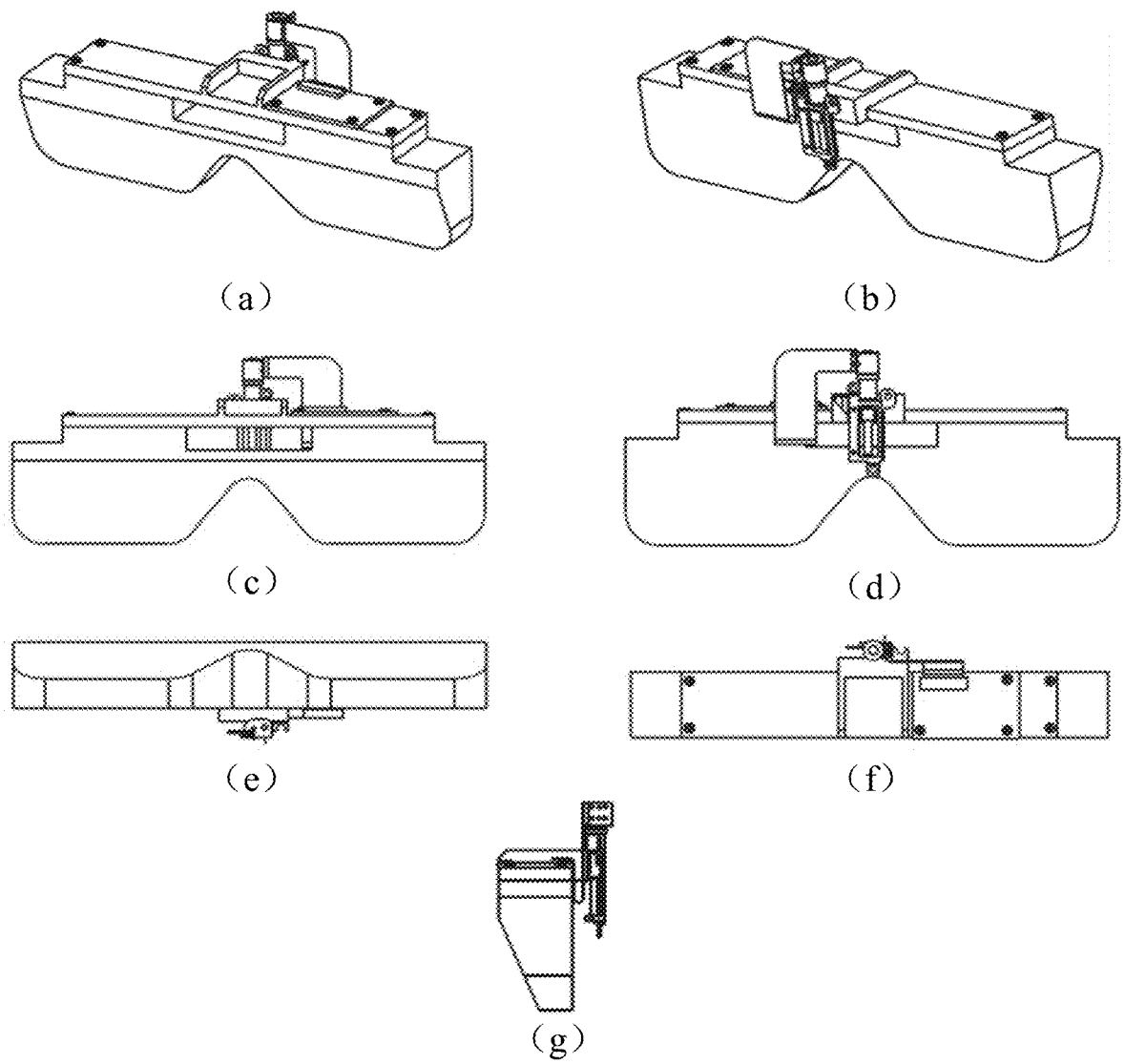
FIG. 9 is a schematic diagram at multiple angles of an augmented reality display apparatus provided in embodiments of the present disclosure.

FIG. 9 shows a schematic diagram at multiple angles of an augmented reality display apparatus provided in embodiments of the present disclosure. FIGS. 9(a) to 9(g) are a three-dimensional view at one angle, a three-dimensional view at another angle, a front view, a rear view, a bottom view, a top view, and a right view, respectively, of the augmented reality display apparatus provided in embodiments of the present disclosure.

To improve comfort during wearing, the lifter 14 may also be arranged above a part of a front side for contact with the nose bridge as shown in FIG. 9(c), so that the center of gravity of the augmented reality display apparatus provided in embodiments of the present disclosure falls on the center of gravity of the apparatus above the nose bridge, and the lifter 14 can also be prevented from blocking the human eyes' view of the outside real scene. In addition, the lifter 14 may also be arranged on a back side of the apparatus, i.e. at a position far from the face when a user wears it, which is conducive to heat dissipation of a motor in the lifter 14, thus reducing the discomfort that may occur when a user wears it.

The working principle and working process of an augmented reality display apparatus provided in embodiments of the present disclosure will be described in detail below in conjunction with FIGS. 10 to 24.

Figure 10:
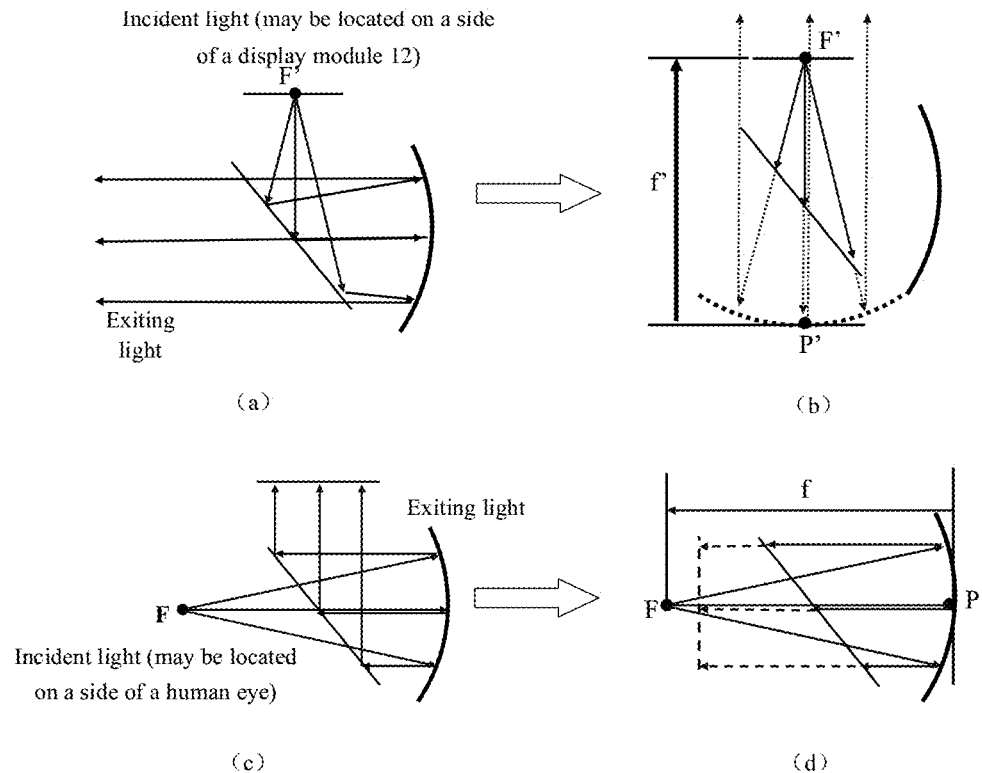
FIG. 10 is a schematic diagram of an image-side focal length and an object-side foal length provided in embodiments of the present disclosure.

It should be understood that as shown in FIG. 10, which is a schematic diagram of an image-side focal length and an object-side foal length provided in embodiments of the present disclosure. As shown in FIG. 10(*a*), if incident light is emitted from a point light source and exiting light includes a plurality of parallel light rays, the position of the incident point can be used as an image-side focus F'. As shown in FIG. 10(*b*), which is a schematic diagram formed after equivalent adjustment of the optical diagram shown in FIG. 10(*a*), a point of intersection of an extension line of the incident light and an extension line of the exiting light in the figure can be used as an image-side principal point P'. Therefore, an image-side focal length f' is the distance between the image-side principal point P' and the image-side focus F'.

As shown in FIG. 10(*c*), if incident light is emitted from a point light source and exiting light includes a plurality of parallel light rays, the position of the incident point can be used as an object-side focus F. As shown in FIG. 10(*d*), which is a schematic diagram formed after equivalent adjustment of the optical diagram shown in FIG. 10(*c*), a point of intersection of an extension line of the incident light and an extension line of the exiting light in the figure can be used as an object-side principal point P. Therefore, an object-side focal length f is the distance between the object-side principal point P and the object-side focus F.

In the process of determining the displacement information by the processor 13 in the apparatus provided in the present disclosure, the Gaussian formula and the Newtonian formula are used as the most basic principles. Specifically, the Gaussian formula is specified as follows:

$$\frac{f}{l'} + \frac{f}{l} = 1 \quad (1)$$

where f and f' are an object-side focal length and an image-side focal length, respectively, and l and l' are the distance from the display system 12 as an image source to a principal point of the optical system 16, and the distance from the target image, when displayed as a virtual image, to the principal point of the optical system 16, respectively.

The Newtonian formula equivalent to the Gaussian formula described above is specified as follows:

$$f \cdot f' = x \cdot x' \quad (2)$$

where f and f' are also an object-side focal length and an image-side focal length, respectively, and x and x' are the distance from the display system 12 as an image source to an object-side focus of the optical system 16, and the distance from the target image, when displayed as a virtual image, to an image-side focus of the optical system 16, respectively.

Figure 11:
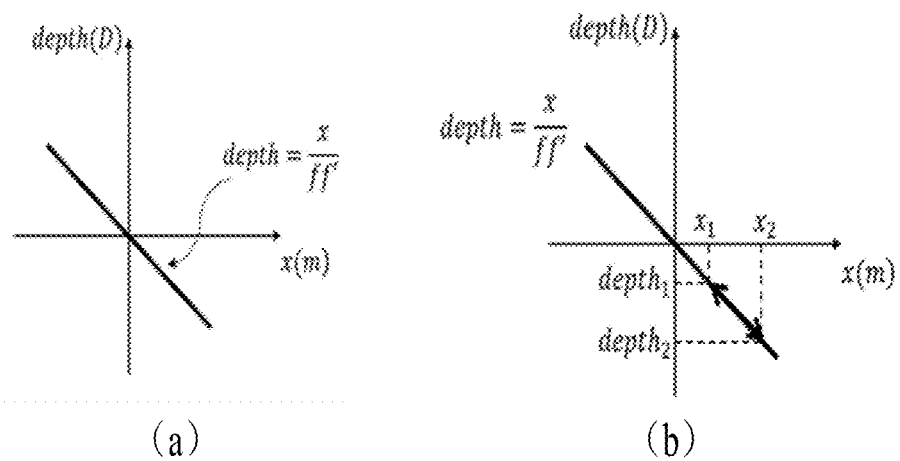
FIG. 11 is schematic diagrams of a linear relationship between the distance between a display system in an augmented reality display apparatus provided in embodiments of the present disclosure and an object-side focus, and a display depth of a target image.

Since the optical principles have proved the equivalence of the above-mentioned Gaussian formula and Newtonian formula, the principles of the apparatus provided in embodiments of the present disclosure are further described here by using only the Newtonian formula as an example. FIG. 11 shows a schematic diagram of a linear relationship between the distance between a display system in an augmented reality display apparatus provided in embodiments of the present disclosure and the object-side focus, and a display depth of the target image. A reciprocal of x' can be denoted by a viewing degree at depth where a virtual image is located when the target image is displayed as the virtual image, i.e., by a variable depth, whose unit is D, and when the virtual image is at infinity, depth=0 D; and the distance from the display system 12 as the image source to the object-side focus of the optical system 16 is x, whose unit is meter (m). A curve of the distance from the display system 12 to the object-side focus of the optical system 16 vs. the viewing degree depth represents a linear relationship as shown in FIG. 11(*a*).

It can be seen from the linear relationship shown in FIG. 11(*a*) that the depth at the display position of the virtual image can be changed by changing the distance x between the image source and the object-side focus of the optical system 16.

FIG. 11(*b*) shows a schematic diagram of a displacement amount range of a display system 12. An adjustment range of the displacement amount x of the display system 12 is between $x_1$ and $x_2$, and the depth at the display position of the virtual image can be changed between $depth_1$ and $depth_2$ accordingly.

If $x_1=0$ and the object-side focal length f=0.02 mm, the displacement amount x of the display system 12 and the depth at the display position of the virtual image are as shown in Table 1.

TABLE 1

Table of a relationship between x and the depth at the display position of the virtual image if $x_1 = 0$, and f = 0.02 m

| | Displacement amount x (mm) | | | | | |
|---|---|---|---|---|---|---|
| | 0 | 0.1 | 0.2 | 0.4 | 0.8 | 1.6 |
| Depth plane (viewing degree) | 0 D | −0.25 D | −0.5 D | −1 D | −2 D | −4 D |
| Depth plane (m) | Infinity | 4 | 2 | 1 | 0.5 | 0.25 |

Figure 12:
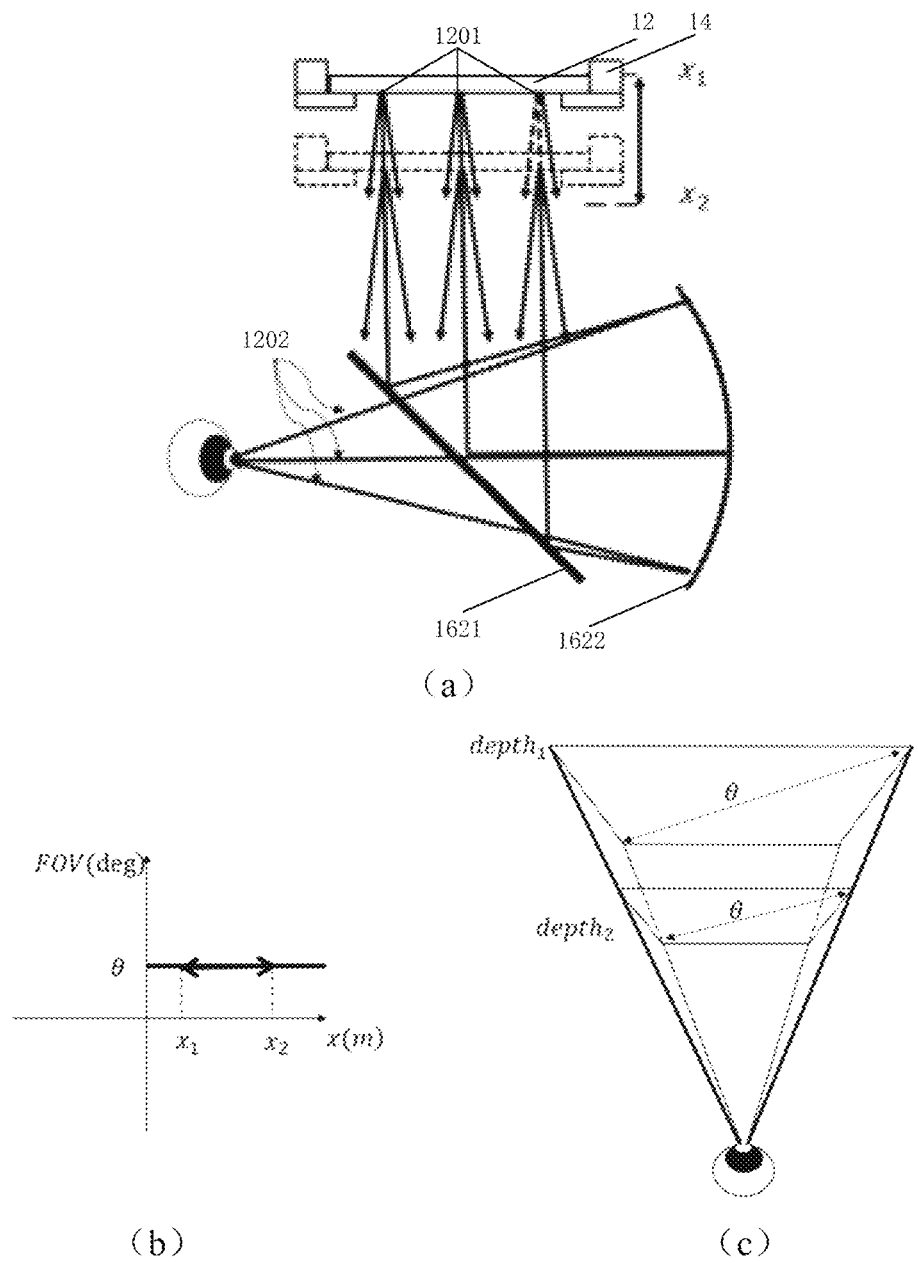
FIG. 12 shows a schematic diagram of an object-side telecentric optical structure of an augmented reality display apparatus provided in embodiments of the present disclosure.

FIG. 12 shows a schematic diagram of an object-side telecentric optical structure of an augmented reality display apparatus provided in embodiments of the present disclosure. When the display system 12 moves, the optical system 16 and the display system 12 can maintain or approximately maintain an object-side telecentric optical structure, which can achieve that if the displacement adjustment range of the display system 12 is $[x_1, x_2]$, the angle of the principal rays 1202 emitted from the pixels 1201 displayed in the display system 12, when entering the human eye pupil, is almost unchanged, such that when the virtual image is displayed at different depths, a field angle θ of augmented reality display is almost unchanged.

In order to achieve that the field angle θ of the virtual image received by the human eye is not change when the display system 12 moves, the display system 12 and the optical system 16 can maintain an object-side telecentric optical structure as much as possible. An ideal object-side telecentric optical structure can be as shown in FIG. 12(*a*).

In this case, an optical axis is perpendicular to the display system 12, and crosses the display system 12 generally at the center of the display system 12. The principal rays 1202 emitted from the pixels 1201 in the display system 12 are parallel to each other, and the center of the human eye pupil is located at the image-side focus of the optical system 16. Hence, the principal rays 1202 emitted from the pixels 1201 in the display system 12 can finally converge at the image-side focus.

If the lifter 14 drives the display system 12 to move along the optical axis, the principal rays 1202 emitted from the pixels 1201 in the display system 12 after the movement may overlap with the principal rays 1202 emitted from the pixels 1201 before the movement of the display system 12. Therefore, after the display system 12 moves along the optical axis, the angle of the principal rays 1202 received by the human eye can be the same as the principal rays 1202 emitted from the pixels 1201 before the movement of the display system 12, and thus, the size of the field of view perceived by the human eye will not be changed.

In addition, for an optical structure that is approximately an object-side telecentric optical structure, the angle of the principal rays 1202 emitted from the pixels 1201 in the display system 12 may be slightly different, and the principal rays 1202 cannot be strictly parallel to each other, and thus, the field angle at the human eye may be slightly changed. Therefore, an angle difference between an edge of the display system 12 and a central principal ray 1202 can be determined according to the amplitudes of acceptable field angle changes for the human eye. For example, this angle difference can be controlled to within ±5°, ±10°, ±20°, ±30°, or the like.

FIG. 12(b) shows a schematic curve diagram of a field angle of the human eye vs. a distance from a display system 12 to the object-side focus of an optical system 16 in an object-side telecentric optical structure, and FIG. 12(c) shows a schematic diagram of a relationship between a field angle of the human eye and a depth at a display position of a virtual image in an object-side telecentric optical structure. FOV is the field angle of the human eye, with a unit of degree (deg); x is the distance from the display system 12 to the object-side focus of the optical system 16, with a unit of meter (m); and $depth_1$ and $depth_2$ are depths at two display positions of the virtual image, respectively.

It should be understood that according to formula (2), the distance between the image source in the augmented reality display apparatus, such as the pixels 1201 displayed by the display system 12, and the object-side focus, is linearly related to the viewing degree of the virtual image displayed for the target image, and the distance between the image source and the object-side focus is inversely proportional to the depth of the virtual image. Therefore, as the lifter 14 drives the display system 12 to move, the amount of display depth change of the virtual image varies for different depth positions of the virtual image.

For example, if the virtual image is at a position of an initial display depth of 1 m, then after the lifter 14 drives the display system 12 to move 0.1 mm towards the direction of the optical system 16, the display depth of the virtual image is 3 m, i.e., the amount of display depth change of the virtual image is 2 m. If the virtual image is at a position of an initial display depth of 3 m, then after the lifter 14 drives the display system 12 to move 0.1 mm towards the direction of the optical system 16, the display depth of the virtual image is 8 m, i.e., the amount of display depth change of the virtual image is 5 m.

Therefore, in the actual scene, for different depths where the virtual image is displayed, the rotation speed of the motor of the lifter 14 varies accordingly, so that the display depth of the virtual image changes in equal steps.

Figure 13:
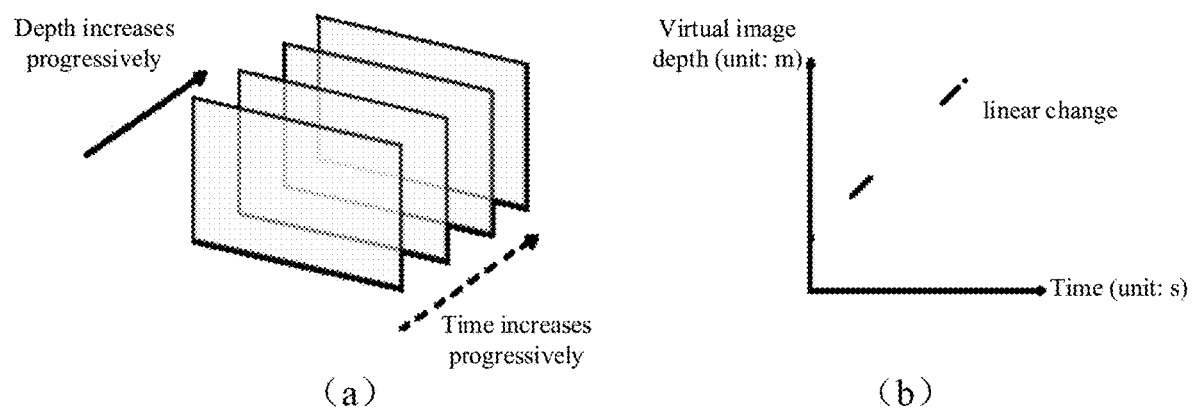
FIG. 13 is a schematic diagram of a relationship between a display depth of a visual image and a working time of a lifter of an augmented reality display apparatus provided in embodiments of the present disclosure.

Optionally, the lifter 14 can be designed to rotate at a uniform speed, while maintaining an equal step change in the display depth of the virtual image, thereby reducing the amount of computation of the displacement information of the display system 12 and reducing the complexity of the whole augmented reality display system. FIG. 13 shows a schematic diagram of a relationship between a display depth of a visual image and a working time of a lifter of an augmented reality display apparatus provided in embodiments of the present disclosure. When the motor of the lifter 14 rotates at a uniform speed, the display depth of the virtual image and the change in time are linearly related.

Figure 14:
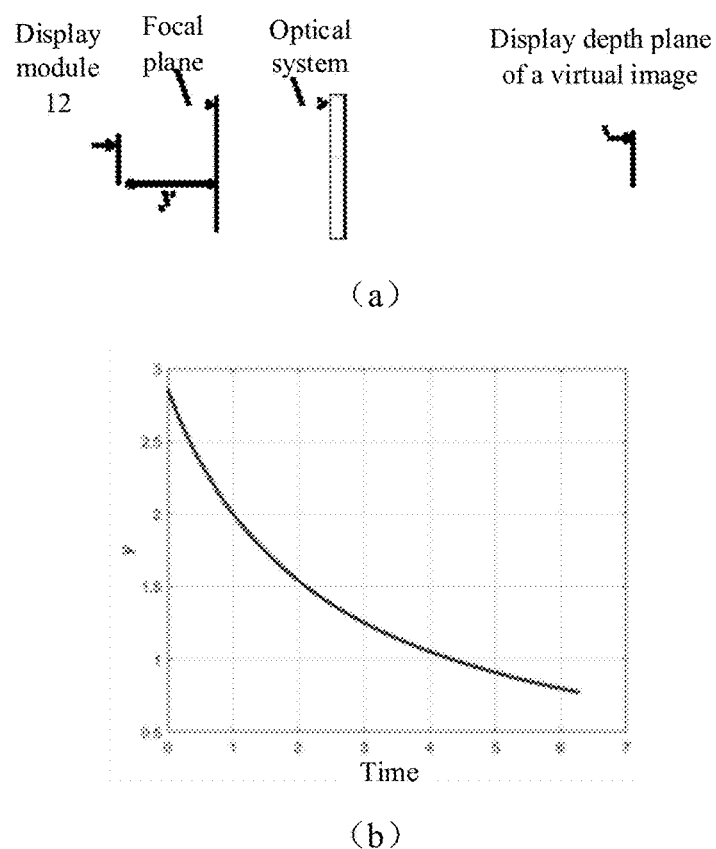
FIG. 14 is a schematic diagram of a distance between a focal plane and a display system of an augmented reality display apparatus provided in embodiments of the present disclosure with respect to a Riccati equation.

FIG. 14 shows a schematic diagram of a distance between a focal plane and a display system of an augmented reality display apparatus provided in embodiments of the present disclosure with respect to a Riccati equation. FIG. 14(a) shows a schematic diagram of an optical system of an augmented reality display apparatus provided in embodiments of the present disclosure. In the case the display depth of the virtual image changes in equal steps, the distance between the display system 12 and the object-side focus needs to satisfy the following Riccati equation:

$$\frac{dy(t)}{dt} = -cy(t)^2 \tag{3}$$

where y is the distance between the display system 12 and the focal plane, t is a time point, c is a constant, and $$\frac{dy(t)}{dt}$$

is the amount of change of the distance y between the display system 12 and the focal plane with the time t.

FIG. 14(b) shows a schematic curve diagram of changes of the distance between the display system 12 of the augmented reality display apparatus provided in embodiments of the present disclosure and the focal plane over time, where time represents uniform rotation of the motor in the lifter 14.

Figure 15:
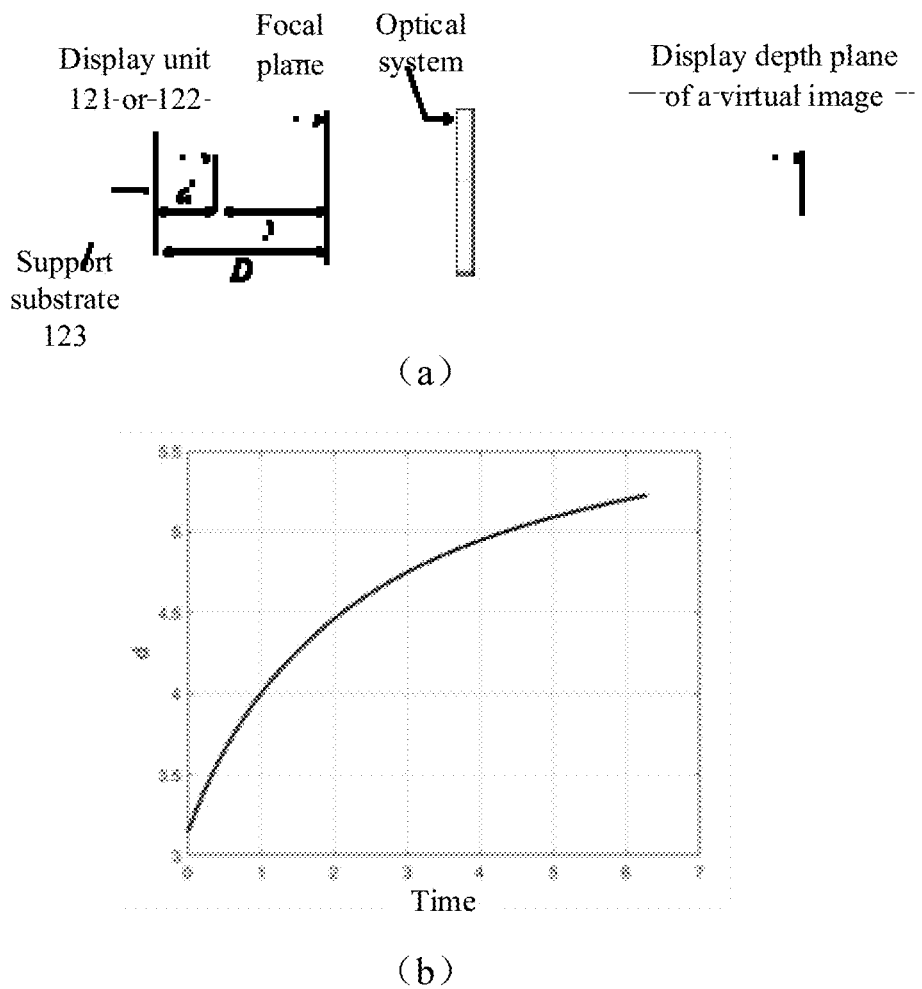
FIG. 15 is a schematic diagram of changes of a distance between a support substrate and a display system of an augmented reality display apparatus provided in embodiments of the present disclosure over time.

It should be understood that FIG. 15 shows a schematic diagram of changes of a distance between a support substrate and a display system of an augmented reality display apparatus provided in embodiments of the present disclosure over time. FIG. 15(a) shows a schematic diagram of the distance between the display system and the support substrate of the augmented reality display apparatus provided in embodiments of the present disclosure. FIG. 15(b) shows a schematic curve diagram of changes of the distance between the display system and the support substrate of the augmented reality display apparatus provided in embodiments of the present disclosure over time, where t is time, d is the distance between the display system 12 and the support substrate 123, and D is the distance between the support substrate 123 and the object-side focus.

Optionally, in order to achieve the linear relationship between the change in display depth of the virtual image and the time of uniform rotation of the motor in the lifter 14 as described above, a profile curve of a cam 1421 of the lifter 14 provided in embodiments of the present disclosure may satisfy the following formula:

$$d = D - \frac{1}{c_1 \theta + c_2} \quad (4)$$

where a support plane is a plane through the center of rotation of the cam 1421 and parallel to the display system 12, D is the distance between the support plane and the object-side focus, C1 and C2 are constants, θ is an amplitude angle of a profile of the cam, and d is the diameter length of the cam.

Optionally, the cam has an asymmetrical outer profile and a single protrusion so as to be able to drive, by rotation, the display system to displace.

Figure 16:
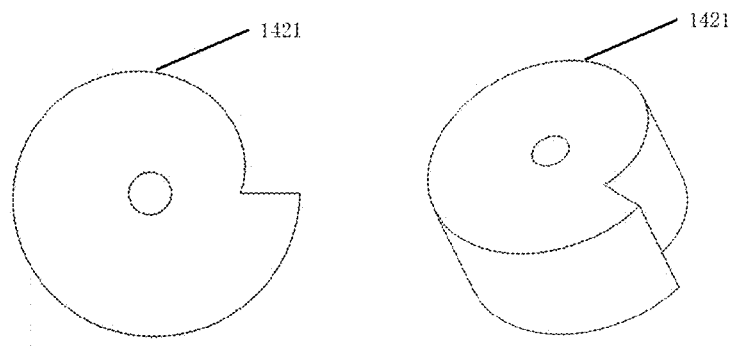
FIG. 16 is a schematic diagram of a cam of an augmented reality display apparatus provided in embodiments of the present disclosure and its rotation.
Figure 16:
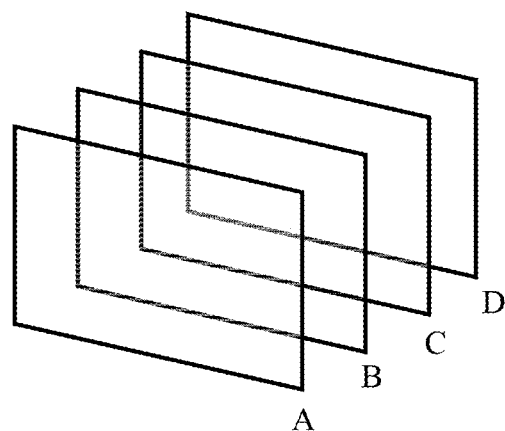

For example, FIG. 16 shows a schematic diagram of a cam of an augmented reality display apparatus provided in embodiments of the present disclosure and its rotation effect. If the cam 1421 in FIG. 16(*a*) is driven to rotate always in one direction, such as clockwise, the virtual image can be displayed in four depth planes A, B, C, and D in FIG. 16(*b*) in turn, i.e., achieving a display strategy that the virtual image is displayed in turn in "A, B, C, D, A, B, C, D, A, B, C, D . . . ".

If the cam 1421 in FIG. 16(*a*) is driven to rotate in two directions alternately, such as first clockwise, then counter-clockwise, and finally clockwise, the virtual image can be displayed in four depth planes A, B, C, and D in FIG. 16(*b*) in turn, i.e., achieving a display strategy that the virtual image is displayed in turn in "A, B, C, D, C, B, A, B, C . . . ".

It can be understood that the depth plane may include a 1st depth plane up to an nth depth plane, where n is an integer greater than or equal to 2. For example, in the example the depth plane includes the above-mentioned four depth planes, it can be understood that n is equal to 4, and the depth plane includes a 1st depth plane, a 2nd depth plane, a 3rd depth plane and a 4th depth plane.

The above-mentioned cam can be driven to rotate in one direction to achieve that the target image is displayed in the 1st depth plane up to the nth depth plane, and in the order of the 1st depth plane up to the nth depth plane. Alternatively, the cam can be driven to rotate alternately in two directions to achieve that the target image is displayed in the 1st depth plane up to the nth depth plane, and in the order of the 1st depth plane up to the nth depth plane and then to the 1st depth plane.

Figure 17:
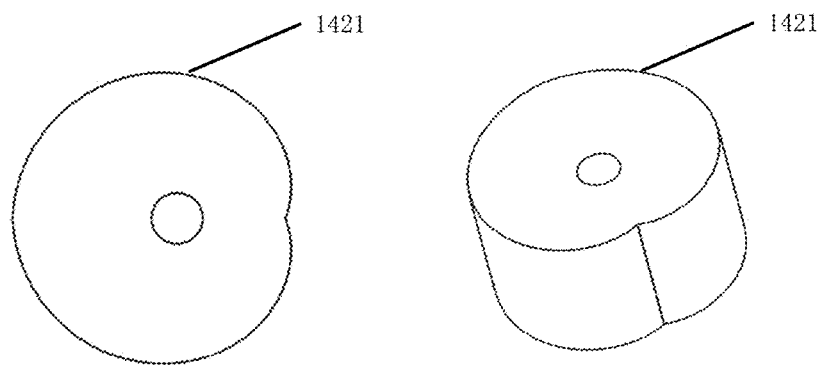
FIG. 17 is a schematic diagram of another cam of an augmented reality display apparatus provided in embodiments of the present disclosure.

As another example, FIG. 17 shows a schematic diagram of another cam of an augmented reality display apparatus provided in embodiments of the present disclosure. A profile amplitude angle of the cam 1421 in FIG. 17 is in the range of [π, 2π], and the profile in [0, π] is symmetrically distributed. That is, the profile amplitude angle of the cam is greater than or equal to π and less than or equal to 2π, and the profile of the cam is symmetrically distributed within a profile amplitude angle greater than or equal to zero and less than or equal to π.

Optionally, the cam has a symmetrical outer profile and symmetrical protrusions.

Regardless of whether the cam 1421 in FIG. 17 is driven to rotate always in one direction or alternately in two directions, the virtual image can be displayed in the four depth planes A, B, C, and D in FIG. 16(*b*) in turn, i.e., achieving the display strategy that the virtual image is displayed in turn in "A, B, C, D, C, B, A, B, C . . . ".

Optionally, the depth plane includes a 1st depth plane up to an nth depth plane, where n is an integer greater than or equal to 2, and the cam is driven to rotate to achieve that the target image is displayed in the 1st depth plane up to the nth depth plane, and in the order of the 1st depth plane up to the nth depth plane, and then to the 1st depth plane.

Optionally, on the one hand, the cam 1421 and the voice coil motor 143 can be both provided in an augmented reality display apparatus provided in embodiments of the present disclosure. Accordingly, when the display system 12 moves to the vicinity of the target position, the processor 13 acquires the position or displacement distance of the display system 12, calculates the distance between the display system 12 and the target position and sends the same to the voice coil motor 143, so that the voice coil motor 143 finely adjusts the position of the display system 12 at a high speed to correct an error of displacement, thereby projecting the virtual image accurately to the corresponding depth plane, thus improving the depth display effect.

On the other hand, in the case a displacement range of the display system 12 is small, it is possible to use the voice coil motor 143 only, and the display system 12 is directly connected to the voice coil motor 143.

Figure 18:
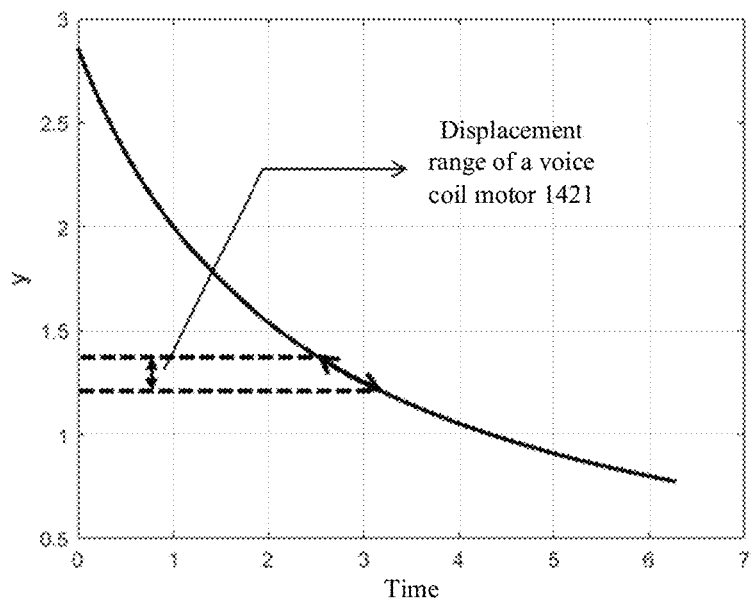
FIG. 18 is a schematic diagram of a displacement curve of a voice coil motor of an augmented reality display apparatus provided in embodiments of the present disclosure.

It should be understood that as shown in FIG. 18, which is a schematic diagram of a displacement curve of a voice coil motor of an augmented reality display apparatus provided in embodiments of the present disclosure, the displacement range of the voice coil motor 143 can be 0.2 mm, and a minimum displacement amount of one movement can be less than 10 μm.

Optionally, in order to enable the virtual image corresponding to the target image to move according to the change of a gaze position human eyes, in an implementation, displacement information of the display system 12 within the displacement range can be determined based on the position information of the depth plane at the gaze position of the human eye.

In this implementation, the depth position information of the target object includes the position information of the depth plane at the gaze position of human eyes. The processor 13 is configured to: determine a displacement range of the display system 12, based on the display depth range of the target image, the image-side focal length between the display system 12 and the optical system 16, and the object-side focal length between the human eye and the optical system 16; and determine displacement information of the display system 12, based on the displacement range of the display system 12 and the position information of the depth plane of at the gaze position of human eyes, in which the displacement information is within the displacement range.

Optionally, to ensure an object-side telecentric optical structure between the human eye and the optical system 16, the displacement information of the display system 12 can be obtained based on the image-side focal length between the display system 12 and the optical system 16, and the object-side focal length between the optical system 16 and the human eye, in embodiments of the present disclosure.

The processor 13 in the apparatus provided in embodiments of the present disclosure is configured to: acquire an image-side focal length between the display system 12 and the optical system 16, and an object-side focal length between the optical system 16 and the human eye; and determine displacement information of the display system 12, based on the position information of the depth plane at the gaze position of human eyes, the image-side focal length between the display system 12 and the optical system 16, and the object-side focal length between the optical system 16 and the human eye.

Figure 19:
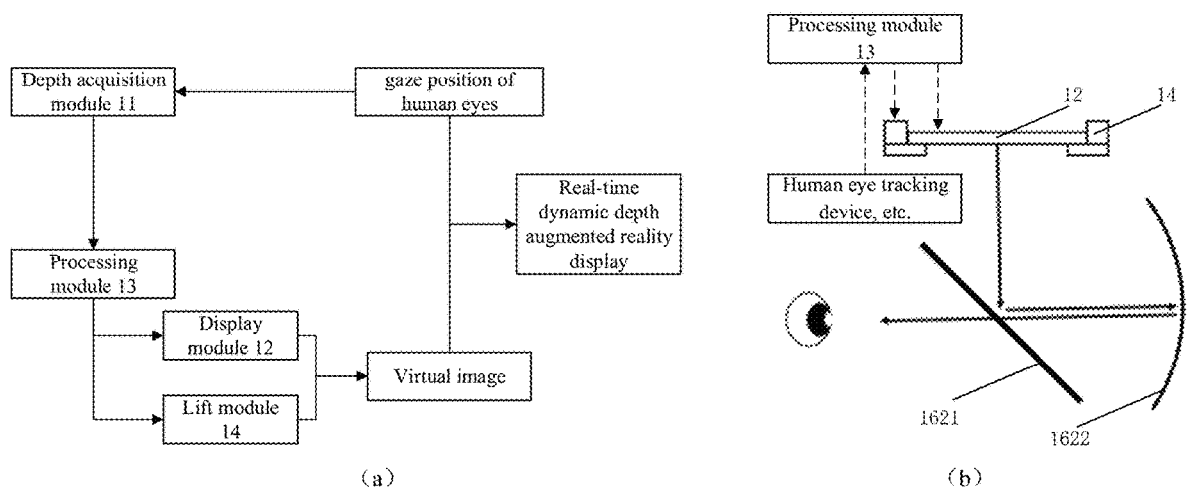
FIG. 19 is a schematic diagram showing movement of a display system based on a gaze position of human eyes, in an augmented reality display apparatus provided in embodiments of the present disclosure.

FIG. 19 shows a schematic diagram showing movement of a display system based on an gaze position of human eyes, in an augmented reality display apparatus provided in embodiments of the present disclosure.

A human eye tracking device in a depth acquisition assembly 11 can acquire, in real time, a depth plane at a position, in the real scene, gazed by human eyes currently, and transmit position information about the depth plane such as depth to the processor 13.

The processor 13 can calculate the displacement information within the displacement range of the display system 12, based on the position information of the depth plane at the gaze position of human eyes, and acquired the image-side focal length between the display system 12 and the optical system 16, and the object-side focal length between the optical system 16 and the human eye. The displacement information may include a displacement direction and a displacement distance of the display system 12, etc.

The processor 13 can also process image information of an original image to be displayed, based on the position information of the depth plane at the gaze position of human eyes, the image-side focal length between the display system 12 and the optical system 16, and the object-side focal length between the optical system 16 and the human eye mentioned above, to obtain image information that can be adapted to the target image after the movement of the display system 12.

The processor 13 can send the calculated displacement information of the display system 12 to the lifter 14, so that the lifter 14 drags the display system 12 to move, according to the displacement information. The processor 13 can also send the image information of the target image obtained by processing to the display system 12, so that the display system 12 displays the target image.

The lifter 14 drags the display system 12 to move, and the display system 12 displays the target image. The lifter 14, the display system 12 and the optical system 16 together implement the display of the virtual image corresponding to the target image, and the virtual image is superimposed onto the real scene.

Figure 20:
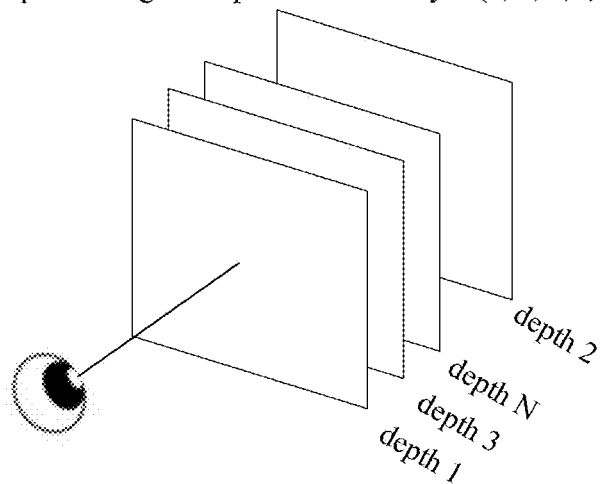
FIG. 20 is a schematic diagram of a display order of a virtual image when a display system is moved based on a gaze position of human eyes, in an augmented reality display apparatus provided in embodiments of the present disclosure.
Figure 20:
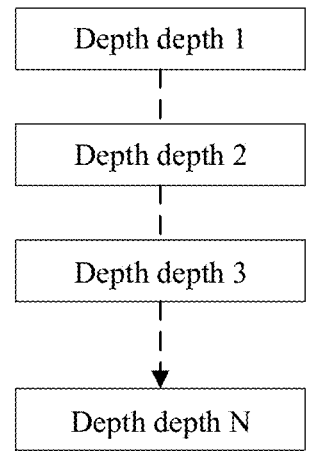

FIG. 20 shows a schematic diagram of a display order of a virtual image when a display system is moved based on a gaze position of human eyes, in the augmented reality display apparatus provided in embodiments of the present disclosure. It should be understood that because the human eye tracking device acquires, in real time, the position information of the depth plane at the gaze position of human eyes, the processor 13 receives a set of position information sequence of depth planes at gaze positions of human eyes over a period of time, and thus, the order in the position information sequence should correspond to the order in an image information sequence of the target image obtained by the processor 13 by processing.

Optionally, in an implementation, the depth position information of the target object includes position information of a plurality of depth planes where the target image is to be displayed. The processor 13 is configured to: determine a displacement range of the display system 12, based on the display depth range of the target image, the image-side focal length between the display system 12 and the optical system 16, and the object-side focal length between the human eye and the optical system 16; and determine a displacement sequence of the display system 12, based on the displacement range of the display system 12 and the position information of the plurality of depth planes where the target image is to be displayed, the displacement sequence including a plurality of displacement information (data), in which the plurality of displacement information in the displacement sequence is within the displacement range.

Optionally, in order to enable the virtual image corresponding to the target image to be displayed at the target position, displacement information of the display system 12 within the displacement range can be determined based on the position information of the plurality of depth planes where the target image is to be displayed.

The processor 13 provided in embodiments of the present disclosure is configured to: acquire an image-side focal length between the display system 12 and the optical system 16, and an object-side focal length between the human eye and the optical system 16; determine a displacement sequence of the display system 12 based on the position information of a plurality of depth planes where the target image is to be displayed, the image-side focal length between the display system 12 and the optical system 16, and the sequence of the plurality of depth planes where the target image is to be displayed.

Figure 21:
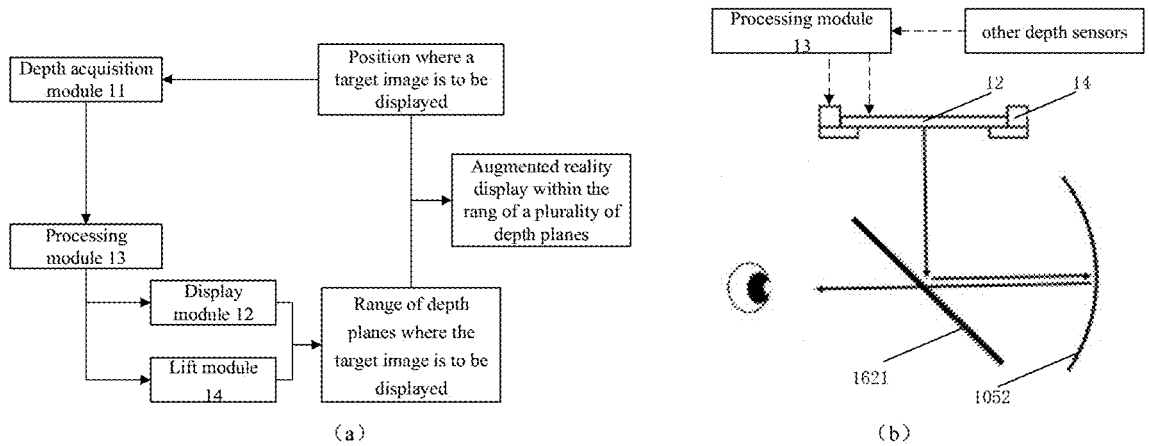
FIG. 21 is a schematic diagram showing movement of a display system based on a position where a target image is to be displayed, in an augmented reality display apparatus provided in embodiments of the present disclosure.

FIG. 21 shows a schematic diagram showing movement of a display system based on a position where a target image is to be displayed, in an augmented reality display apparatus provided in embodiments of the present disclosure.

Other sensing devices, such as a structured light depth sensing device, in the depth acquisition assembly 11 can acquire, in real time, position information of a plurality of depth planes where the target position is to be displayed, and transmit the position information about the plurality of depth planes such as depth to the processor 13.

The processor 13 can calculate a displacement sequence including a plurality of displacement information (data) within the displacement range of the display system 12, based on the position information of the plurality of depth planes where the target position is to be displayed, the acquired image-side focal length between the display system 12 and the optical system 16, and the sequence of the plurality of depth planes where the target image is to be displayed. The displacement information may include a displacement direction and a displacement distance of the display system 12, etc.

The processor 13 can also process an image information sequence of an original image to be displayed, based on the position information of the plurality of depth planes where the target position is to be displayed, the acquired image-side focal length between the display system 12 and the optical system 16, and the sequence of the plurality of depth planes where the target image is to be displayed mentioned above, to obtain an image information sequence that can be adapted to the target image after the movement of the display system 12.

The processor 13 can send the calculated displacement sequence of the display system 12 to the lifter 14, so that the lifter 14 sequentially drags the display system 12 to move, according to the displacement sequence. The processor 13 can also send the image information sequence of the target image obtained by processing to the display system 12, so that the display system 12 sequentially display the target image.

The lifter 14 drags the display system 12 to move, according to the order of the displacement information in the displacement sequence, and the display system 12 displays the target image, according to the order of the image information in the image information sequence. The lifter 14, the display system 12 and the optical system 16 together implement the display of a plurality of virtual images corresponding to a plurality of target images, and the plurality of virtual images are superimposed onto the real scene, so that the plurality of virtual images can be cyclically displayed in the real scene.

Figure 22:
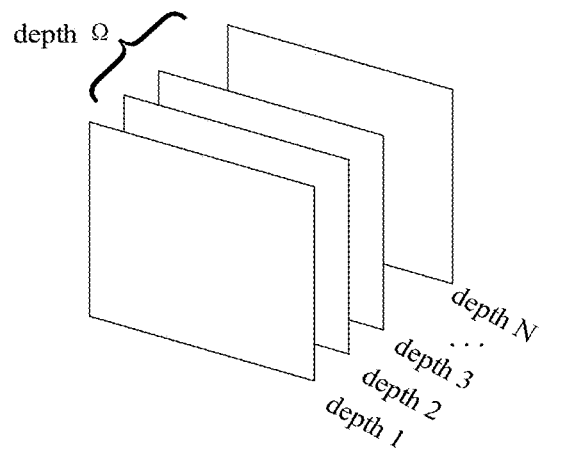
FIG. 22 is a schematic diagram of a display order of a virtual image when a display system is moved based on a position where a target image is to be displayed, in an augmented reality display apparatus provided in embodiments of the present disclosure.
Figure 22:
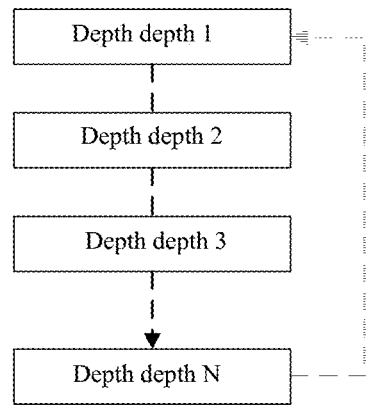

FIG. 22 shows a schematic diagram of a display order of a virtual image when the display system is moved based on a position where a target image is to be displayed, in an augmented reality display apparatus provided in embodiments of the present disclosure. It should be understood that because the above-mentioned augmented reality display method described above is implemented based on the position where the target image is to be displayed, the changing order of the gaze position of human eyes is not related to the display order of the virtual image corresponding to the target image.

It should be understood that in the augmented reality display apparatus provided in embodiments of the present disclosure, the display system 12 can be moved based on both the change of the gaze position of human eyes, and the position where the target image is to be displayed, thereby bringing a more personalized augmented reality viewing experience to the human eye.

Optionally, in an implementation, the depth position information of the target object includes position information of a depth plane at a gaze position of human eyes, and position information of a plurality of depth planes where the target image is to be displayed. The processor 13 is configured to: determine displacement information of the display system 12 based on a sequence of depth information of gaze of human eyes if the target image includes a dynamic image; and determines a displacement sequence of the display system 12 based on a range of depth position information where the target image is to be displayed if the target image includes a static image.

For example, when it needs to display to the human eye a target image, such as a small animal, or a person, that can move with the change of the gaze position of human eyes, the processor can determine displacement information of the display system 12 based on a sequence of depth information of gaze of human eyes. At the same time, if it also needs to display to the human eye a target image, such as an object, a building, or the like, to be displayed cyclically, the processor can also determine a displacement sequence of the display system 12 based on a range of depth position information where the target image is to be displayed.

It should be understood that in an example where the depth position information of the target object includes both position information of a depth plane at a gaze position of human eyes, and position information of a plurality of depth planes where the target image is to be displayed, the display system 12 displays both a dynamic image and a static image. In this case, the processor 13 can alternately send image information of the target image and displacement information of the display system 12 to the lifter 14 and the display system 12, respectively. The processor 13 can first send image signals and displacement information related to the static image, then send image signals and displacement information related to the dynamic image, and subsequently send image signals and displacement information related to the static image.

Since the processor 13 sends the displacement information and image information very fast, and the lifter drags the display system 12 to move also quite fast, the phenomenon of persistence of vision of the human eye results in that the human eye cannot identify that the display system 12 is quickly moving and quickly switching the target image.

Therefore, in the augmented reality display apparatus provided in embodiments of the present disclosure, the display system 12 is moved and the target image is displayed, based on both the position where the target image is to be displayed and the change of the gaze position of human eyes, without affecting the viewing experience of the human eye.

Optionally, in an example where the depth position information of the target object includes both position information of a depth plane at a gaze position of human eyes, and position information of a plurality of depth planes where the target image is to be displayed, the processor 13 is configured to: determine a displacement sequence of the display system 12 based on a range of depth position information where the target image is to be displayed, if the position information of the depth plane at the gaze position of human eyes is within the position information of the plurality of depth planes where the target image is to be displayed; and determine displacement information of the display system 12 based on a sequence of depth information of gaze of human eyes, if the position information of the depth plane at the gaze position of human eyes is not within the position information of the plurality of depth planes where the target image is to be displayed.

For example, when the depth plane at the gaze position of human eyes is within the depth position range where the target image is to be displayed, the human eye can see the target image within the depth position range, and the depth acquisition assembly 11 does not need to acquire the gaze position of human eyes in real time. When the depth plane at the gaze position of human eyes is not within the depth position range where the target image is to be displayed, the human eye cannot see the target image within the depth position range, and the depth acquisition assembly 11 needs to acquire the gaze position of human eyes in real time, so that the human eye can see the target image.

Optionally, in order to enable the augmented reality display apparatus provided in embodiments of the present disclosure in use to display a virtual image that is more in line with the visual effect of the human eye, out-of-focus rendering can be performed on a target image outside a range of gaze of human eyes.

In this embodiment, the processor 13 is configured to: determine position information of a plurality of depth planes at gaze positions of human eyes based on the position information of the depth plane at the gaze position of human eyes; determine a position where the target image is to be displayed based on the position information of the plurality of depth planes at the gaze positions of human eyes; and perform out-of-focus rendering on the target image.

Optionally, in an implementation, when the augmented reality display apparatus is in a binocular display state, out-of-focus rendering can be performed on a target image at a depth to be gazed by the human eye, by using parallax information of the human eye at the depth to be gazed by the human eye in combination with image blurring technology, such as low-pass filtering to smooth graphics.

Figure 23:
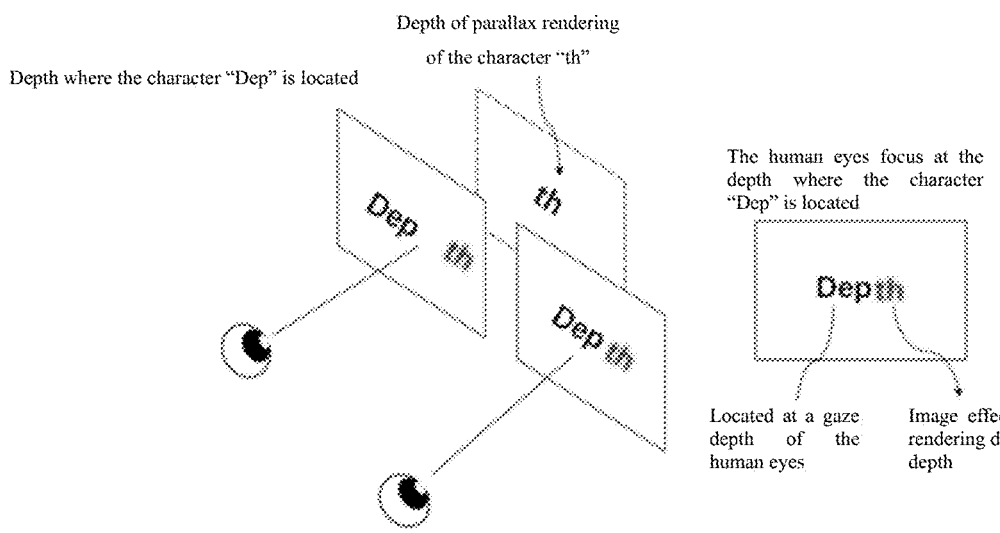
FIG. 23 is a schematic diagram of out-of-focus rendering when a display system is moved based on a gaze position of human eyes, in an augmented reality display apparatus provided in embodiments of the present disclosure.

FIG. 23 shows a schematic diagram of out-of-focus rendering when a display system is moved based on a gaze position of human eyes, in an augmented reality display apparatus provided in embodiments of the present disclosure. The character "Dep" and the character "th" are in different depth planes, and the depth where the character "Dep" is located is the depth of the gaze position of human eyes, and at that time the human eyes can view the clear character "Dep". At that time the character "th" is located in a depth plane of at a position to be gazed by the human eyes, that is, not being an object gazed by the human eyes currently. When the human eyes are gazing at the depth where the character "Dep" is located, the character "th" is in out-of-focus fuzzy display. Hence, the out-of-focus image character "th" with parallax information can be displayed in the depth plane where the character "Dep" is located, by means of binocular parallax, and an out-of-focus display effect of the character "th" can be achieved thereby, and the display effect of the character "th" can be rendered to the depth where it is to be displayed.

Optionally, in an implementation, similar to the above-mentioned out-of-focus rendering method and effect, when the augmented reality display apparatus is in the binocular display state, out-of-focus rendering can be performed on an image outside a depth plane where the target image is to be displayed, by using parallax information and image blurring technology, such as low-pass filtering to smooth graphics.

Figure 24:
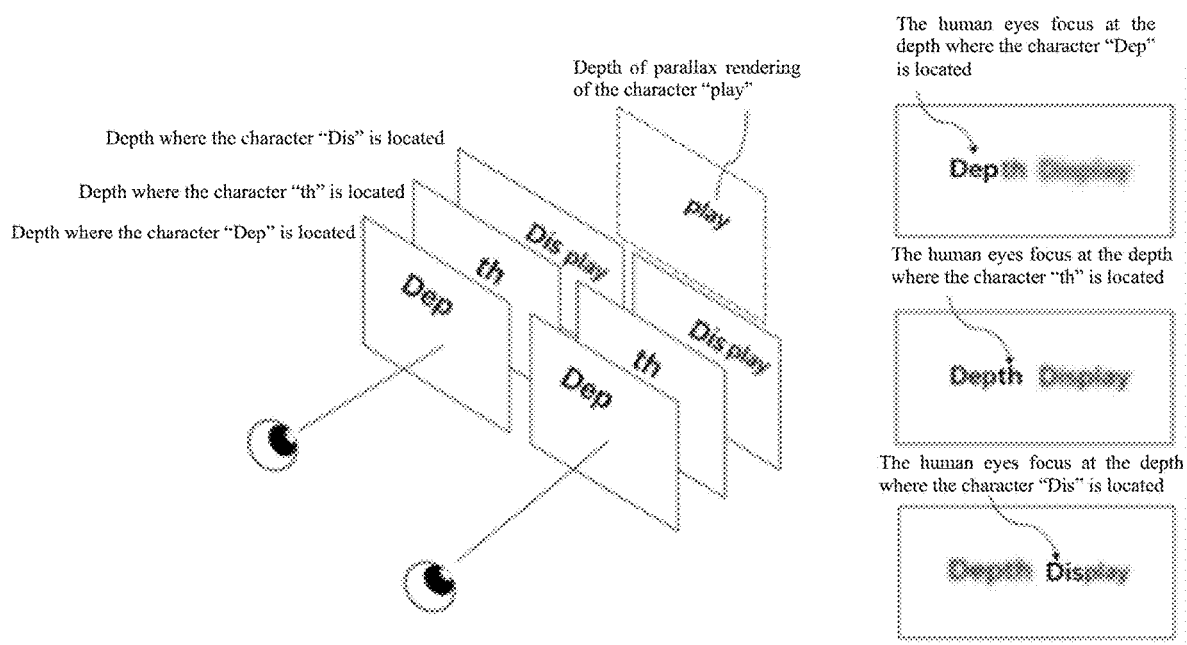
FIG. 24 is a schematic diagram of out-of-focus rendering when a display system is moved based on a position where a target image is to be displayed, in an augmented reality display apparatus provided in embodiments of the present disclosure.

FIG. 24 shows a schematic diagram of out-of-focus rendering when a display system is moved based on a position where a target image is to be displayed, in an augmented reality display apparatus provided in embodiments of the present disclosure. Although the characters "Dep", "th", and "Dis" are displayed in different depth planes, the human eye can see the characters "Dep", "th", and "Dis" by gazing them within the range of the plurality of depth planes where they are displayed. The character "play" is displayed outside the above-mentioned range of the plurality of depth planes, so when the human eye views other characters, the character "play" is in out-of-focus fuzzy display. Hence, when the character "Dep", "th", or "Dis" are displayed, an out-of-focus image with parallax information of character "play" can be displayed in the depth planes where the character "Dep", "th", or "Dis" are located, by means of binocular parallax, and the display effect of the character "play" can be rendered to the depth where it is to be displayed.

An augmented reality display apparatus provided in embodiments of the present disclosure includes a depth acquisition assembly, a display system, a processor, a lifter, and a spectacle frame. The depth acquisition assembly is configured to acquire depth position information of a target object, the target object including at least one of human eyes, a target image and a real environment within a field of view of the human eyes, the depth position information of the target object including position information of a depth plane at a gaze position of the human eyes, and/or position information of a depth plane where the target image is to be displayed, and/or position information of a depth plane of the real environment. The display system is configured to display the target image. The processor is fixedly connected to the display system, and the processor is configured to determine displacement information of the display system based on the depth position information of the target object acquired by the depth acquisition assembly. The lifter is fixedly connected to the spectacle frame, and the lifter is connected to the processor by a cable. A driver in the lifter is fixedly connected to the display system, and the lifter is configured to drive the display system to move to a target position based on the displacement information determined by the processor. The target position is a final arrival position of the display system indicated by the displacement information.

In this way, when the display system moves, it can ensure that the angle of light received by the human eyes does not change, by ensuring an object-side telecentric optical structure between the display system and an optical system, and thus the lifter driving the display system to move within a displacement range, based on the displacement information determined by the processor can achieve real-time multi-depth augmented reality display.

Embodiments of the present disclosure provide an optional augmented reality display apparatus. The augmented reality display apparatus includes: a display system configured to display a target image; a depth acquisition assembly configured to acquire depth position information of a target object, the target object including at least one of human eyes, the target image, and a real environment within a field of view of the human eyes, the depth position information of the target object including at least one of position information of a depth plane at a gaze position of human eyes, position information of a depth plane where the target image is to be displayed, and position information of a depth plane of the real environment; a processor fixedly connected to the display system, the processor being configured to determine displacement information of the display system based on the depth position information of the target object acquired by the depth acquisition assembly; a spectacle frame connected to the display system and the depth acquisition assembly; and a lifter fixedly connected to the spectacle frame, the lifter being connected to the processor by a cable, a driver in the lifter being fixedly connected to the display system, the lifter being configured to drive the display system to move to a target position relative to the spectacle frame based on the displacement information determined by the processor, the target position being a final arrival position of the display system indicated by the displacement information.

Embodiments of the present disclosure provide another optional augmented reality display apparatus. The augmented reality display apparatus includes: a display system configured to display a target image; a depth acquisition assembly configured to acquire depth position information of a target object, the target object including at least one of human eyes, the target image, and a real environment within a field of view of the human eyes, the depth position information of the target object including at least one of position information of a depth plane at a gaze position of human eyes, position information of a depth plane where the target image is to be displayed, and position information of a depth plane of the real environment; a processor fixedly connected to the display system, the processor being configured to determine displacement information of the display system based on the depth position information of the target object acquired by the depth acquisition assembly; a spectacle frame fixedly connected to the depth acquisition assembly; a lifter including a miniature spring connected to the spectacle frame and a driver configured to drive the display system to move relative to the spectacle frame, the driver including at least one of a cam and a voice coil motor, in which the driver drives the display system to move to a target position based on the displacement information determined by the processor, the target position being a final arrival position of the display system indicated by the displacement information.

Embodiments of the present disclosure provide yet another optional augmented reality display apparatus. The augmented reality display apparatus includes: a display system configured to display a target image; a depth acquisition assembly configured to acquire depth position information of a target object, the target object including human eyes and the target image, the depth position information of the target object including position information of a depth plane at a gaze position of human eyes, and position information of a depth plane where the target image is to be displayed, in which the depth acquisition assembly performs real-time acquisition of the gaze position of human eyes, based on the depth plane at the gaze position of human eyes being outside a depth position range where the target image is to be displayed; a processor fixedly connected to the display system, the processor being configured to determine displacement information of the display system based on the depth position information of the target object acquired by the depth acquisition assembly; a spectacle frame connected to the display system and the depth acquisition assembly; and a lifter fixedly connected to the spectacle frame, the lifter being configured to drive the display system to move to a target position relative to the spectacle frame based on the displacement information determined by the processor, the target position being a final arrival position of the display system indicated by the displacement information.

Embodiments of the present disclosure also provide an augmented reality display device, which may include the augmented reality display apparatus described above. It should be understood that the augmented reality display device in practical applications includes, but is not limited to, wearable devices such as augmented reality display glasses, and may also be used in at least one of devices capable of providing an augmented reality experience to a user.

It is to be noted that as used herein, the terms "comprise", "include" or any other variants are intended to cover non-exclusive inclusion, such that a process, method, article or apparatus that comprises a series of elements includes not only those elements, but also other elements not explicitly listed, or inherent elements of such a process, method, article or apparatus. In the absence of more limitations, an element defined by the expression "comprising one . . . " does not exclude the presence of other identical elements in the process, method, article or apparatus including the element.

Embodiments of the present disclosure are described above in conjunction with the accompanying drawings, but the present disclosure is not limited to the specific implementations described above. The foregoing specific implementations are only schematic and not restrictive. Under the enlightenment of the present disclosure, those of ordinary skill in the art can also make many forms without departing from the spirit of the present disclosure and the protection scope of the claims, and these all fall within the protection of the present disclosure.

What is claimed is:

1. An augmented reality display apparatus, comprising:
a display system configured to display a target image;
a depth acquisition assembly configured to acquire depth position information of a target object, the target object comprising at least one of human eyes, the target image, and a real environment within a field of view of human eyes, the depth position information of the target object comprising at least one of position information of a depth plane at a gaze position of human eyes, position information of a depth plane where the target image is to be displayed, and position information of a depth plane of the real environment;
a processor fixedly connected to the display system, the processor being configured to determine displacement information of the display system based on the depth position information of the target object acquired by the depth acquisition assembly;
a spectacle frame connected to the display system and the depth acquisition assembly; and
a lifter fixedly connected to the spectacle frame, the lifter being connected to the processor by a cable, a driver in the lifter being fixedly connected to the display system, the lifter being configured to drive the display system to move to a target position relative to the spectacle frame based on the displacement information determined by the processor, the target position being a final arrival position of the display system indicated by the displacement information,
wherein the driver comprises a cam, the cam is connected to a back side of the display system by a miniature support, has a surface in slide fit with the back side of the display system, and drives the display system to displace by rotating about a central axis of rotation of the cam,
wherein the driver comprises a voice coil motor coupled to the processor and configured to finely adjusts a position of the display system at a high speed to correct an error of displacement when the display system moves to a vicinity of the target position, the processor being configured to acquire a position or displacement distance of the display system, calculate a distance between the display system and the target position, and send the same to the voice coil motor.

2. The augmented reality display apparatus according to claim 1, wherein a plane through a center of rotation of the cam and parallel to the display system is defined as a support plane, a profile curve of the cam satisfying the equation:

$$d = D - \frac{1}{c_1 \theta + c_2},$$

where D is a distance between the support plane and an object-side focus, $C_1$ and $C_2$ are constants, and $\theta$ is an amplitude angle of a profile of the cam.

3. The augmented reality display apparatus according to claim 2, wherein the depth plane comprises a 1st depth plane up to an nth depth plane, where n is an integer greater than or equal to 2, and the cam is driven to rotate in one direction to achieve that the target image is displayed in the 1st depth plane up to the nth depth plane, and in the order of the 1st depth plane up to the nth depth plane.

4. The augmented reality display apparatus according to claim 2, wherein the depth plane comprises a 1st depth plane up to an nth depth plane, where n is an integer greater than or equal to 2, and the cam is driven to rotate alternately in two directions to achieve that the target image is displayed in the 1st depth plane up to the nth depth plane, and in the order of the 1st depth plane up to the nth depth plane and then to the 1st depth plane.

5. The augmented reality display apparatus according to claim 2, wherein the depth plane comprises a 1st depth plane up to an nth depth plane, where n is an integer greater than or equal to 2, and the cam is driven to rotate to achieve that the target image is displayed in the 1st depth plane up to the nth depth plane, and in the order of the 1st depth plane up to the nth depth plane, and then to the 1st depth plane.

6. The augmented reality display apparatus according to claim 1, wherein the cam has an asymmetrical outer profile and a single protrusion.

7. The augmented reality display apparatus according to claim 1, wherein a profile amplitude angle of the cam is greater than or equal to $\pi$ and less than or equal to $2\pi$, and the profile of the cam is symmetrically distributed within a profile amplitude angle greater than or equal to zero and less than or equal to $\pi$.

8. The augmented reality display apparatus according to claim 1, wherein the cam has a symmetrical outer profile and symmetrical protrusions.

9. The augmented reality display apparatus according to claim 1, wherein:
the cam is configured to drive the display system to move to a vicinity of the target position;
the voice coil motor is connected to the processor, and the processor is configured to acquire position information of the display system and, based on the position information of the display system, determine a distance and direction of fine adjustment of the display system driven by the voice coil motor; and
the voice coil motor is fixedly connected to the back side of the display system, and the voice coil motor is configured to finely adjust a position of the display system when the display system displaces to the vicinity of the target position, such that the display system arrives at the target position.

10. The augmented reality display apparatus according to claim 1, wherein the lifter further comprises a plurality of miniature springs, each miniature spring has a first end fixedly connected to the display system and s second end fixedly connected to the spectacle frame, the plurality of miniature springs are configured to keep a tilt angle of the display system consistent during displacement.

11. The augmented reality display apparatus according to claim 10, wherein the display system has a front side provided with a display screen and a back side opposite to the front side, and the first end of each miniature spring is fixedly connected to a region without the display screen, of the front side of the display system, or the first end of each miniature spring is connected to the back side of the display system.

12. An augmented reality display device comprising an augmented reality display apparatus, the augmented reality display apparatus comprising:
a display system configured to display a target image;
a depth acquisition assembly configured to acquire depth position information of a target object, the target object comprising at least one of human eyes, a target image, and a real environment within a field of view of the human eyes, the depth position information of the target object comprising at least one of position information of a depth plane at a gaze position of human eyes, position information of a depth plane where the target image is to be displayed, and position information of a depth plane of the real environment;
a processor fixedly connected to the display system, the processor being configured to determine displacement information of the display system based on the depth position information of the target object acquired by the depth acquisition assembly;
a spectacle frame fixedly connected to the depth acquisition assembly;
a lifter comprising:
a miniature spring connected to the spectacle frame, and
a driver configured to drive the display system to move relative to the spectacle frame, wherein the driver drives the display system to move to a target position based on the displacement information determined by the processor, the target position being a final arrival position of the display system indicated by the displacement information,
wherein the driver comprises a cam, the cam being connected to a back side of the display system by a miniature support, rotatable about a central axis of rotation of the cam, and having a surface in slide fit with a back side of the display system such that when the cam rotates about a center of rotation, the cam is configured to drive the display system to displace,
wherein the driver comprises a voice coil motor coupled to the processor and configured to finely adjusts a position of the display system at a high speed to correct an error of displacement when the display system moves to a vicinity of the target position, the processor being configured to acquire a position or displacement distance of the display system, calculate a distance between the display system and the target position, and send the same to the voice coil motor.

13. The augmented reality display device according to claim 12, the display system comprising a first display, a second display, and a support substrate, wherein:
the first display corresponds to a left eye and is configured to emit light of the target image to the left eye;
the second display corresponds to a right eye and is configured to emit light of the target image to the right eye;
the first display and the second display are fixedly connected to the support substrate; and
the first display and the second display are axisymmetrical about a centerline of the support substrate.

14. The augmented reality display apparatus according to claim 12, further comprising an optical system fixedly connected to the spectacle frame, the optical system being optically aligned with the display system to perform preset processing on light emitted from pixels in the display system such that the light emitted by the display system arrives at the human eyes, wherein the preset processing comprises at least one of amplification processing, reflection processing and transmission processing.

15. The augmented reality display apparatus according to claim 14, wherein the optical system comprises a lens assembly fixedly connected to the spectacle frame, and the lens assembly comprises at least one lens optically aligned, and is configured to perform aberration correction on the light emitted from the pixels in the display system.

16. The augmented reality display device according to claim 12, wherein the a voice coil motor is fixedly connected to a back side of the display system, and the voice coil motor is configured to drive the display system to displace to the target position.

17. An optional augmented reality display apparatus, comprising:
a display system configured to display a target image;
a depth acquisition assembly configured to acquire depth position information of a target object, the target object comprising human eyes and the target image, the depth position information of the target object comprising position information of a depth plane at a gaze position of human eyes, and position information of a depth plane where the target image is to be displayed;
a processor fixedly connected to the display system, the processor being configured to:
determine displacement information of the display system based on the depth position information of the target object acquired by the depth acquisition assembly,
determine position information of a plurality of depth planes at gaze positions of human eyes based on the position information of the depth plane at the gaze position of human eyes, determine a position where the target image is to be displayed based on the position information of the plurality of depth planes at the gaze positions of human eyes, and perform out-of-focus rendering on the target image, wherein when the augmented reality display apparatus is in a binocular display state, out-of-focus rendering is performed on an image outside a depth plane where the target image is to be displayed by using parallax information and image blurring technology;

a spectacle frame connected to the display system and the depth acquisition assembly; and a lifter fixedly connected to the spectacle frame, a driver in the lifter being fixedly connected to the display system, the lifter being configured to drive the display system to move to a target position relative to the spectacle frame based on the displacement information determined by the processor, the target position being a final arrival position of the display system indicated by the displacement information, wherein the driver comprises a cam, the cam is connected to a back side of the display system by a miniature support, has a surface in slide fit with the back side of the display system, and drives the display system to displace by rotating about a central axis of rotation of the cam, wherein the driver comprises a voice coil motor coupled to the processor and configured to finely adjusts a position of the display system at a high speed to correct an error of displacement when the display system moves to a vicinity of the target position, the processor being configured to acquire a position or displacement distance of the display system, calculate a distance between the display system and the target position, and send the same to the voice coil motor.

* * * * *